US006951598B2

(12) United States Patent
Flugge et al.

(10) Patent No.: US 6,951,598 B2
(45) Date of Patent: Oct. 4, 2005

(54) HYDROPHOBICALLY MODIFIED CATIONIC ACRYLATE COPOLYMER/POLYSILOXANE BLENDS AND USE IN TISSUE

(75) Inventors: Lisa Ann Flugge, Neenah, WI (US); Kelly Dean Branham, Winneconnne, WI (US); William Clayton Bunyard, DePere, WI (US); Thomas Gerard Shannon, Neenah, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 10/289,562

(22) Filed: Nov. 6, 2002

(65) Prior Publication Data

US 2004/0086727 A1 May 6, 2004

(51) Int. Cl.⁷ ..................... D21H 17/59; B23B 25/20; C08G 77/26; C08L 83/08
(52) U.S. Cl. ................... 162/164.4; 162/112; 162/135; 428/292.7; 428/447; 428/452; 524/588; 525/474
(58) Field of Search ...................... 525/474; 524/588; 428/292.7, 447, 452; 162/112, 135, 164.4

(56) References Cited

U.S. PATENT DOCUMENTS

| 3,556,932 A | 1/1971 | Coscia et al. |
| 3,556,933 A | 1/1971 | Williams et al. |
| 3,695,269 A | 10/1972 | Malaney |
| 3,700,623 A | 10/1972 | Keim |
| 3,772,076 A | 11/1973 | Keim |
| 3,838,692 A | 10/1974 | Levesque |
| 3,855,158 A | 12/1974 | Petrovich et al. |
| 3,879,257 A | 4/1975 | Gentile et al. |
| 3,899,387 A | 8/1975 | Freis et al. |
| 3,899,388 A | 8/1975 | Petrovich et al. |
| 4,100,324 A | 7/1978 | Anderson et al. |
| 4,129,528 A | 12/1978 | Petrovich et al. |
| 4,147,586 A | 4/1979 | Petrovich et al. |
| 4,162,190 A | 7/1979 | Ashworth |
| 4,222,921 A | 9/1980 | Van Eenam |
| 4,287,251 A | 9/1981 | King et al. |
| 4,297,860 A | 11/1981 | Pacifici et al. |
| 4,326,000 A | 4/1982 | Roberts |
| 4,377,615 A | 3/1983 | Suzuki et al. |
| 4,406,737 A | 9/1983 | Latimer et al. |
| 4,408,996 A | 10/1983 | Baldwin |
| 4,414,268 A | 11/1983 | Baldwin |

(Continued)

FOREIGN PATENT DOCUMENTS

| CA | 2059627 A1 | 7/1992 |
| EP | 0 347 153 A2 | 12/1989 |
| EP | 0 347 154 A2 | 12/1989 |
| EP | 0 350 277 A2 | 1/1990 |
| EP | 0 497 100 A2 | 8/1992 |
| EP | 0 347 177 B2 | 5/1995 |
| EP | 0 347 154 B1 | 1/1996 |
| EP | 0 643 083 B1 | 5/1997 |
| EP | 0 347 176 B2 | 7/1997 |
| EP | 1 013 823 A1 | 6/2000 |
| EP | 0 708 860 B1 | 11/2000 |
| FR | 2715052 A1 | 7/1999 |
| GB | 1372787 | 11/1974 |
| WO | WO 98/40425 | 9/1998 |
| WO | WO 99/05358 | 2/1999 |
| WO | WO 99/55962 | 11/1999 |
| WO | WO 00/04233 | 1/2000 |
| WO | WO 00/77303 | 12/2000 |
| WO | WO 01/04416 A1 | 1/2001 |
| WO | WO 01/14631 | 3/2001 |
| WO | WO 01/29312 | 4/2001 |
| WO | WO 01/49937 A1 | 7/2001 |
| WO | WO 02/44470 A1 | 6/2002 |
| WO | WO 02/48457 A | 6/2002 |
| WO | WO 2002/072951 A2 | 9/2002 |
| WO | WO 2003/021037 A1 | 3/2003 |
| WO | WO 2003/037394 A1 | 5/2003 |

OTHER PUBLICATIONS

Patent Abstract of JP 3–266367 B Description of Dow Corning Toray Silicone Co. Ltd., "Silicone Emulsion Composition for Treatment of Wiping Paper."

Foulger, M. et al., "New Technology to Apply Starch and Other Additivies," *Pulp & Paper Canada*, vol. 100, No. 2, 1999, pp. 24–25.

TAPPI Official Test Method T 402 om–93, "Standard Conditioning and Testing Atmospheres For Paper, Board, Pulp Handsheets, and Related Products," published by the TAPPI Press, Atlanta, Georgia, revised 1993, pp 1–3.

TAPPI Official Method T 411 om–89, "Thickness (Caliper) of Paper, Paperboard, and Combined Board," published by the TAPPI Press, Atlanta, Georgia, revised 1989, pp. 1–3.

Derwent World Patent Database abstract of JP 06–270361 A: Description of New OJI Paper Co. Ltd., "Strainer Bag."

Luo, Yingwu and F. Joseph Schork, "Emulsion Copolymerization of Butyl Acrylate With Cationic Monomer Using Interfacial Redox Initiator System," *Journal of Polymer Science: Part A: Polymer Chemistry*, vol. 39, 2001, pp. 2696–2709.

Yan, Zegui et al., Synthesis and Characterization of Cationic Copolymers of Butylacrylate and [3–(Methacryloylamino)–propyl]trimethylammonium Chloride, *Journal of Polymer Science, Part A: Polymer Chemistry*, vol. 39, 2001, pp. 1031–1039.

TAPPI Official Test Method T 530 pm–89, "Size Test for Paper By Ink Resistance (Hercules Method)," published by the TAPPI Press, Atlanta, Georgia, revised 1989, pp. 1–5.

*Primary Examiner*—Jeffrey B. Robertson
(74) *Attorney, Agent, or Firm*—Gregory E. Croft; Patricia A. Charlier (57) ABSTRACT

The present invention is a soft tissue sheet. The tissue sheet comprises papermaking fibers and a polysiloxane composition. The polysiloxane composition comprises a polysiloxane and a compatible synthetic resin binder having a glass transition temperature of about 100° C. or less.

49 Claims, 1 Drawing Sheet

U.S. PATENT DOCUMENTS

| | | |
|---|---|---|
| 4,425,186 A | 1/1984 | May et al. |
| 4,425,372 A | 1/1984 | Baldwin |
| 4,426,418 A | 1/1984 | Coleman et al. |
| 4,432,833 A | 2/1984 | Breese |
| 4,440,597 A | 4/1984 | Wells et al. |
| 4,514,345 A | 4/1985 | Johnson et al. |
| 4,528,239 A | 7/1985 | Trokhan |
| 4,529,480 A | 7/1985 | Trokhan |
| 4,537,822 A | 8/1985 | Nanri et al. |
| 4,551,199 A | 11/1985 | Weldon |
| 4,556,450 A | 12/1985 | Chuang et al. |
| 4,559,162 A | 12/1985 | Abel et al. |
| 4,588,457 A | 5/1986 | Crenshaw et al. |
| 4,605,702 A | 8/1986 | Guerro et al. |
| 4,610,915 A | 9/1986 | Crenshaw et al. |
| 4,773,110 A | 9/1988 | Hopkins |
| 4,816,320 A | 3/1989 | St. Cyr |
| 4,886,632 A | 12/1989 | Van Iten et al. |
| 4,894,054 A | 1/1990 | Miskinyar |
| 4,905,545 A | 3/1990 | Leising et al. |
| 4,919,877 A | 4/1990 | Parsons et al. |
| 4,925,528 A | 5/1990 | Tse et al. |
| 4,950,545 A | 8/1990 | Walter et al. |
| 5,059,282 A | 10/1991 | Ampulski et al. |
| 5,098,522 A | 3/1992 | Smurkoski et al. |
| 5,164,046 A | 11/1992 | Ampulski et al. |
| 5,178,729 A | 1/1993 | Janda |
| 5,215,626 A | 6/1993 | Ampulski et al. |
| 5,215,629 A | 6/1993 | Skatulla et al. |
| 5,227,242 A | 7/1993 | Walter et al. |
| 5,230,776 A | 7/1993 | Andersson et al. |
| 5,234,547 A | 8/1993 | Knight et al. |
| 5,246,545 A | 9/1993 | Ampulski et al. |
| 5,246,546 A | 9/1993 | Ampulski |
| 5,260,171 A | 11/1993 | Smurkoski et al. |
| 5,275,700 A | 1/1994 | Trokhan |
| 5,277,242 A | 1/1994 | Arrington |
| 5,328,565 A | 7/1994 | Rasch et al. |
| 5,334,289 A | 8/1994 | Trokhan et al. |
| 5,353,521 A | 10/1994 | Orloff |
| 5,385,643 A | 1/1995 | Ampulski |
| 5,389,204 A | 2/1995 | Ampulski |
| 5,399,412 A | 3/1995 | Sudall et al. |
| 5,431,786 A | 7/1995 | Rasch et al. |
| 5,494,554 A | 2/1996 | Edwards et al. |
| 5,496,624 A | 3/1996 | Stelljes et al. |
| 5,500,277 A | 3/1996 | Trokhan et al. |
| 5,503,715 A | 4/1996 | Trokhan et al. |
| 5,514,523 A | 5/1996 | Trokhan et al. |
| 5,525,345 A | 6/1996 | Warner et al. |
| 5,529,665 A | 6/1996 | Kaun |
| 5,538,595 A | 7/1996 | Trokhan et al. |
| 5,552,020 A | 9/1996 | Smith et al. |
| 5,554,467 A | 9/1996 | Trokhan et al. |
| 5,558,873 A | 9/1996 | Funk et al. |
| 5,566,724 A | 10/1996 | Trokhan et al. |
| 5,573,637 A | 11/1996 | Ampulski et al. |
| 5,591,306 A | 1/1997 | Kaun |
| 5,598,642 A | 2/1997 | Orloff et al. |
| 5,598,643 A | 2/1997 | Chuang et al. |
| 5,607,980 A | 3/1997 | McAtee et al. |
| 5,614,293 A | 3/1997 | Krzysik et al. |
| 5,624,790 A | 4/1997 | Trokhan et al. |
| 5,628,876 A | 5/1997 | Ayers et al. |
| 5,635,191 A | 6/1997 | Roe et al. |
| 5,637,194 A | 6/1997 | Ampulski et al. |
| 5,638,876 A | 6/1997 | Shimotoyodome et al. |
| 5,643,588 A | 7/1997 | Roe et al. |
| 5,650,218 A | 7/1997 | Krzysik et al. |
| 5,656,132 A | 8/1997 | Farrington et al. |
| 5,679,218 A | 10/1997 | Vinson et al. |
| 5,695,607 A | 12/1997 | Oriaran et al. |
| 5,699,626 A | 12/1997 | Chuang et al. |
| 5,701,682 A | 12/1997 | Chuang et al. |
| 5,725,736 A | 3/1998 | Schroeder et al. |
| 5,763,044 A | 6/1998 | Ahr et al. |
| 5,772,845 A | 6/1998 | Farrington et al. |
| 5,785,813 A | 7/1998 | Smith et al. |
| 5,830,317 A | 11/1998 | Vinson et al. |
| 5,830,321 A | 11/1998 | Lindsay et al. |
| 5,846,380 A * | 12/1998 | Van Phan et al. ............ 162/111 |
| 5,849,447 A | 12/1998 | Matsuda |
| 5,855,739 A | 1/1999 | Ampulski et al. |
| 5,871,763 A | 2/1999 | Luu et al. |
| 5,885,416 A | 3/1999 | Marinack et al. |
| 5,885,418 A | 3/1999 | Anderson et al. |
| 5,893,965 A | 4/1999 | Trokhan et al. |
| 5,897,745 A | 4/1999 | Ampulski et al. |
| 5,932,068 A | 8/1999 | Farrington, Jr. et al. |
| 5,935,381 A | 8/1999 | Trokhan et al. |
| 5,954,921 A | 9/1999 | Dahmen et al. |
| 5,968,853 A | 10/1999 | Kelly et al. |
| 5,972,813 A | 10/1999 | Polat et al. |
| 5,981,044 A | 11/1999 | Phan et al. |
| 5,990,377 A | 11/1999 | Chen et al. |
| 6,010,598 A | 1/2000 | Boutilier et al. |
| 6,017,417 A | 1/2000 | Wendt et al. |
| 6,027,611 A | 2/2000 | McFarland et al. |
| D421,528 S | 3/2000 | Shakora |
| 6,054,020 A | 4/2000 | Goulet et al. |
| 6,080,686 A | 6/2000 | Floyd |
| 6,096,169 A | 8/2000 | Hermans et al. |
| 6,103,060 A | 8/2000 | Munerelle et al. |
| 6,103,063 A | 8/2000 | Oriaran et al. |
| 6,132,803 A | 10/2000 | Kelly et al. |
| 6,143,135 A | 11/2000 | Hada et al. |
| 6,149,768 A | 11/2000 | Hepford |
| 6,149,769 A | 11/2000 | Mohammadi et al. |
| 6,179,961 B1 | 1/2001 | Ficke et al. |
| 6,197,154 B1 | 3/2001 | Chen et al. |
| 6,224,714 B1 | 5/2001 | Schroeder et al. |
| 6,231,719 B1 | 5/2001 | Garvey et al. |
| 6,274,667 B1 | 8/2001 | Shannon et al. |
| 6,287,418 B1 | 9/2001 | Schroeder et al. |
| 6,315,866 B1 | 11/2001 | Sanchez |
| 6,319,365 B1 | 11/2001 | Inoue |
| 6,332,952 B1 | 12/2001 | Hsu et al. |
| 6,365,667 B1 | 4/2002 | Shannon et al. |
| 6,379,498 B1 | 4/2002 | Burns et al. |
| 6,395,957 B1 | 5/2002 | Chen et al. |
| 6,423,183 B1 | 7/2002 | Goulet et al. |
| 6,432,268 B1 | 8/2002 | Burghardt |
| 6,432,270 B1 | 8/2002 | Liu et al. |
| 6,458,243 B1 | 10/2002 | Jones et al. |
| 6,488,812 B2 | 12/2002 | Shannon et al. |
| 6,514,383 B1 | 2/2003 | Liu et al. |
| 6,582,560 B2 | 6/2003 | Runge et al. |
| 2002/0112835 A1 | 8/2002 | Liu et al. |
| 2002/0139500 A1 | 10/2002 | Runge et al. |
| 2002/0162243 A1 | 11/2002 | Rungee et al. |
| 2003/0022568 A1 * | 1/2003 | Branham et al. .............. 442/59 |
| 2003/0056916 A1 * | 3/2003 | Horenziak et al. ....... 162/157.7 |
| 2003/0077314 A1 | 4/2003 | Shannon et al. |
| 2004/0074622 A1 | 4/2004 | Liu et al. |
| 2004/0118532 A1 | 6/2004 | Sarbo et al. |
| 2004/0118533 A1 | 6/2004 | Shannon et al. |
| 2004/0144507 A1 | 7/2004 | Shannon et al. |

* cited by examiner

FIGURE 1

HYDROPHOBICALLY MODIFIED CATIONIC ACRYLATE COPOLYMER/POLYSILOXANE BLENDS AND USE IN TISSUE

BACKGROUND OF THE INVENTION

In the manufacture of tissue products, such as facial tissue, bath tissue, paper towels, dinner napkins and the like, a wide variety of product properties are imparted to the final product through the use of chemical additives applied in the wet end of the tissue making process. Two of the most important attributes imparted to tissue sheets and tissue products through the use of wet end chemical additives are strength and softness. Specifically for bulk softness, a chemical debonding agent is normally used. Such debonding agents are typically quaternary ammonium compounds containing long chain alkyl groups. The cationic quaternary ammonium entity allows for the debonding agent to be retained on the cellulose via ionic bonding to anionic groups on the cellulose fibers. The long chain alkyl groups provide softness to the tissue sheet by disrupting fiber-to-fiber hydrogen bonds in the tissue sheet.

The use of such debonding agents is broadly taught in the art. Such disruption of fiber-to-fiber bonds provides a twofold purpose in increasing the softness of the tissue sheet. First, the reduction in hydrogen bonding produces a reduction in tensile strength thereby reducing the stiffness of the sheet. Secondly, the debonded fibers provide a surface nap to the tissue sheet enhancing the "fuzziness" of the tissue sheet. This tissue sheet fuzziness may also be created through use of creping as well, where sufficient interfiber bonds are broken at the outer surface of the tissue sheet to provide a plethora of free fiber ends on the surface of the tissue sheet. Both debonding and creping increase levels of lint and slough in the tissue product. Indeed, while softness increases, it is at the expense of an increase in lint and slough in the tissue sheet relative to an untreated control. It can also be shown that in a blended (non-layered) tissue sheet that the level of lint and slough is inversely proportional to the tensile strength of the tissue sheet. Lint and slough can generally be defined as the tendency of the fibers in the tissue sheet to be rubbed from the tissue sheet when handled.

It is also known in the art to use a multi-layered tissue structure to enhance the softness of the tissue sheet. In such a tissue structure, a thin layer of strong softwood fibers is used in the center layer to provide the necessary tensile strength for the tissue product. The outer layers of such a tissue structure are composed of the shorter hardwood fibers, which may or may not contain a chemical debonder. A disadvantage to using such layered structures is that while softness of the tissue sheet is increased, the mechanism for such increase is believed due to an increase in the surface nap of the debonded, shorter fibers. As a consequence, such tissue structures, while showing enhanced softness, do so with a trade-off of an increase in the level of lint and slough.

It is also known in the art to concurrently add a chemical strength agent in the wet-end to counteract the negative effects of the debonding agents. In a blended tissue sheet, the addition of such agents reduces lint and slough levels. However, such a reduction occurs at the expense of surface feel and overall softness and becomes primarily a function of sheet tensile strength. In a layered tissue structure, strength chemicals are typically added to the center layer. While this perhaps helps to give a tissue sheet with an improved surface feel at a given tensile strength, such tissue structures actually exhibit higher slough and lint at a given tensile strength, with the level of debonder in the outer layer being directly proportional to the increase, in lint and slough. U.S. Pat. No. 6,488,812 issued on Dec. 3, 2002 to Shannon et al. discloses low slough tissue products made with synthetic polymers (acrylamides containing hydrophobic moieties). These synthetic polymers, while reducing the amount of slough compared to traditional debonders, may still show an increase in slough with decreasing tensile strength.

Another well known process for improving softness in tissue is to topically apply a softener to the surface of the tissue sheet. A broad range of softeners is known in the art. An especially effectively topical softener is polysiloxane. For example, polysiloxane treated tissue sheets are described in U.S. Pat. No. 4,950,545, issued on Aug. 21, 1990 to Walter et al.; U.S. Pat. No. 5,227,242, issued on Jul. 13, 1993 to Walter et al.; U.S. Pat. No. 5,558,873, issued on Sep. 24, 1996 to Funk et al.; U.S. Pat. No. 6,054,020, issued on Apr. 25, 2000 to Goulet et al.; U.S. Pat. No. 6,231,719, issued on May 15, 2001 to Garvey et al.; and, U.S. Pat. No. 6,432,270, issued on Aug. 13, 2002 to Liu et al., which are incorporated by reference to the extent that they are non-contradictory herewith. A variety of substituted and non-substituted polysiloxanes may be used.

While polysiloxanes are exceptionally good at improving softness there are some drawbacks to their use. Polysiloxanes are relatively expensive. Only polysiloxane on the outermost surface of the tissue sheet is believed to contribute to tactile softness. Polysiloxane present in the z-direction contributes only to bulk softness, i.e., its ability to impact softness is dependent only on its ability to reduce interfiber hydrogen bonding. Interfiber hydrogen bonding may be more efficiently controlled with traditional quaternary ammonium debonding agents.

Polysiloxanes are also effective debonders. Typically polysiloxanes are applied to the tissue sheet as an emulsion in a printing or spraying process. Some polysiloxane penetrates the z-direction of the tissue sheet and reduces the relative bonded area of the tissue sheet, especially at the topmost surface of the tissue sheet. This reduction in relative bonded area is typically accompanied by a loss of tensile strength. Along with this loss in strength comes an increase in the amount of lint and slough in the tissue sheet or tissue product.

It is known to add certain binders to the tissue sheet to mitigate the tensile loss and higher lint associated with application of the polysiloxane. For example see U.S. Pat. No. 5,389,204, issued on Feb. 14, 1995 to Ampulski; U.S. Pat. No. 5,385,643, issued on Jan. 13, 1995 to Ampulski; and, U.S. Pat. No. 5,573,637, issued on Nov. 12, 1996 to Ampulski, the disclosures of which are herein incorporated by reference to the extent that they are non-contradictory herewith. Such binders are typically limited to traditional paper strength agents known in the art and specific examples typically still more limited to traditional dry strength starches. By combining traditional paper strength agents with polysiloxanes, the traditional paper strength agents may mitigate some of the tensile loss associated with the debonding action of the polysiloxane. However such a combination introduces a large number of hydrogen or covalent bonds to the tissue sheet, thereby increasing the stiffness of the tissue sheet, reducing the softness of the tissue sheet. Furthermore, these materials themselves have high glass transition temperatures that further increase the stiffness of the sheet. Furthermore, aldehyde, epoxy, and azetidinium functional strength agents may react prematurely with functional groups, if present, on the polysiloxane, particularly amino-functional polysiloxanes, to form crosslinked gels that may hinder application to the tissue sheet. Furthermore, other traditional paper strength chemicals are not compatible with polydimethylsiloxanes typically used in tissue making processes. This lack of compatibility may cause separation into two distinct phases, a polysiloxane phase and a polymer phase. The phases are discontinuous on a macro scale, allowing the polysiloxane to migrate into the tissue sheet and hence further reduce the softness of the tissue sheet and any resulting tissue products.

Typically the binders must be added as a separate step either as a second post treatment or in the wet end of the tissue making process. Although concurrent addition of polysiloxane has been noted in the art, such practice is difficult as incompatibility of the binder and the polysiloxane make simultaneous application detrimental to the tissue making process.

Latex binders, specifically styrene-butadiene rubber latexes, may be used in conjunction with polysiloxane to mitigate strength loss. The application of latex binders combined directly with polysiloxanes has not been taught in the art. Commonly used tissue-making latex binders are not compatible with polysiloxanes and polysiloxane emulsions and therefore can not be added to the tissue sheet concurrent with the polysiloxane. Hence, again a two separate step process is required, one step for applying the polysiloxane and one step for applying the latex binder. Furthermore, these latex binders are in the form of emulsions containing a high level of surfactant. The latex binders are not of themselves water dispersible. The emulsions are susceptible to breaking, causing a film of the latex binder to develop on processing equipment. This film of latex binder continues to deposit on equipment to the point where shutdown and clean-up of the equipment is required. As the latex binders are not water dispersible, clean-up may be time consuming, costly and environmentally unfriendly.

Therefore, there is a need for a means of reducing lint and slough in soft tissue sheets containing polysiloxanes while maintaining softness and strength of the tissue sheets. There is furthermore a need for reducing lint and slough at the same time as applying the polysiloxane. There is a further need to mitigate the z-directional penetration of the polysiloxane when applied to tissue sheets so as to improve softness of the tissue sheet using lower levels of polysiloxane.

It is an objective of the present invention to design polysiloxane emulsions for treating tissue and towel products possessing an ability to reduce lint and slough while maintaining the softness of the treated tissue sheet. It is a further objective of the present invention to make soft, low lint and slough tissue products such as sanitary bath tissue, facial tissue, paper towels and the like via the application of such polysiloxane emulsions containing compatible binders. It is a further objective of the present invention to apply the binder simultaneously with the polysiloxane as part of a single formulation package. Still furthermore, it is an objective of the present invention to improve the tactile softness of tissue sheets by applying a polysiloxane to the surface of tissue sheet in a manner that minimizes the z-directional penetration of the polysiloxane in the tissue sheet. In this manner equivalent softness of the tissue sheet may be obtained at lower application levels of polysiloxane.

SUMMARY OF THE INVENTION

It has now been discovered that when certain water dispersible or water soluble cationic synthetic co-polymers are combined with polysiloxanes and then topically applied to a formed tissue sheet, levels of lint and slough in the tissue sheet are reduced while producing equivalently soft tissue sheets at lower levels of polysiloxane. While not wishing to be bound by theory, it is believed that the cationic synthetic co-polymers of the present invention form compatible blends with the polysiloxanes. Hence, the polysiloxane is retained on the fiber surfaces by the binders and less prone to z-directional migration. The cationic synthetic co-polymers of the present invention are also good film forming agents and have good intermolecular adhesive properties. Hence, the fibers of the tissue sheet are held in place by the cationic synthetic co-polymer to cationic synthetic co-polymer cohesive properties and good slough reduction occurs. As such, fibers treated with emulsions of polysiloxane and these cationic synthetic co-polymers (polysiloxane compositions) produce a tissue sheet having lower lint and slough levels at a given tensile strength than a tissue sheet prepared without the binders made of the cationic synthetic co-polymers. Furthermore, the tissue sheets or resulting tissue products are found to have equivalent softness at higher tensile strength and lower polysiloxane concentrations.

The term "water dispersible" as used herein, means that the synthetic co-polymers are either water soluble or capable of existing as stable colloidal, self-emulsifiable or other type dispersions in water without the presence of added emulsifiers. Added emulsifiers may be employed within the scope of the present invention to aid in the polymerization of the synthetic co-polymers or assist in compatiblizing the synthetic co-polymers with other chemical agents used in the tissue sheet or tissue-making process, however, the emulsifiers are not essential to the formation of stable dispersions or solutions of the cationic synthetic co-polymer in water.

The term "compatible" as used herein, means that when dried, the polysiloxane and binder composition forms a film that does not show gross phase separation or curdling. The polysiloxane and binder may or may not be miscible. The term "miscible" as used herein, means that when dried, the polysiloxane and binder composition forms a film that is a single phase and the polysiloxane and binder may not be distinguishable as separate phase entities. By definition, the term miscibility also implies compatibility although compatibility does not imply miscibility.

In one aspect, the present invention resides in a polysiloxane composition for preparing soft tissue sheets and tissue products, the composition comprising a polysiloxane and a compatible water dispersible or water soluble synthetic resin binder, the synthetic resin preferably being a cationic water dispersible synthetic co-polymer having the general structure:

Wherein:
$R^1$, $R^2$, $R^3$ are independently H; $C_{1-4}$ alkyl radicals; and, mixtures thereof.
$R^4$ is a $C_1$–$C_8$ alkyl radical or mixtures thereof.
$Z^1$ is a bridging radical attaching the $R^4$ functionality to the polymer backbone. Examples include, but are not limited to, —O—, —COO—, —OOC—, —CONH—, —NHCO—, and mixtures thereof.
$Q^1$ is a cationic functionality. One example of such a cationic functionality is a functional group containing a cationic quaternary ammonium radical.

$Q^2$ is an optional non-ionic hydrophilic or water soluble monomer (and mixtures thereof) incorporated into the synthetic co-polymer so as to make the synthetic co-polymer more hydrophilic. $Q^2$ possess limited ability to hydrogen or covalently bond to cellulose fibers, such bonding resulting in an increase in stiffness of the tissue sheet. Suitable hydrophilic monomers or water-soluble nonionic monomers for use in the cationic synthetic co-polymers of the present invention include, but are not limited to monomers, such as, hydroxyalkyl acrylates and hydroxyalkyl methacrylates, such as hydroxyethyl methacrylate (HEMA); hydroxyethyl acrylate; polyalkoxyl acrylates, such as polyethyleneglycol acrylates; and, polyalkoxyl methacrylates, such as polyethyleneglycol methacrylates ("PEG-MA"). Other suitable hydrophilic monomers or water-soluble nonionic monomers for use in the ion-sensitive cationic synthetic co-polymers of the present invention include, but are not limited to, diacetone acrylamide, N-vinylpyrrolidinone, N-vinylformamide, and mixtures thereof.

The mole ratio of z:x will specifically range from about 0:1 to about 4:1, more specifically from about 0:1 to about 1:1, and most specifically from about 0:1 to about 1:3. The mole ratio of (x+z):y may be from about 0.98:0.02 to about 1:1, most specifically from about 0.95:0.05 to about 0.70:0.30.

The polysiloxane composition further comprises a polysiloxane component. The particular structure of the polysiloxane is not overly critical to the present invention so long as the polysiloxane provides the desired benefits to the tissue sheet or tissue product. Functional and non-functional polysiloxanes are suitable for mixing with the cationic synthetic co-polymer. Polysiloxanes encompass a very broad class of compounds. They are characterized in having the following backbone structure:

wherein R' and R" may be a broad range of organo and non-organo groups including mixtures of such groups and wherein n is an integer $\geq 2$. These polysiloxanes may be linear, branched or cyclic. They include a wide variety of polysiloxane co-polymers containing various compositions of functional groups, hence, R' and R" actually may represent many different types of groups within the same polymer molecule. The organo or non-organo groups may be capable of reacting with the cellulose fibers to covalently, ionically or hydrogen bond the polysiloxane to the cellulose fibers. These functional groups may also be capable of reacting with themselves to form crosslinked matrixes with the cellulose fibers. The scope of the present invention should not be construed as limited by a particular polysiloxane structure so long as that polysiloxane structure delivers the aforementioned softness benefits to the final tissue sheet or tissue product and so long as no detrimental interactions with the binder occurs.

While not wishing to be bound by theory, the softness benefits that polysiloxanes deliver to cellulose fiber containing tissue sheets or tissue products is believed to be, in part, related to the molecular weight of the polysiloxane. Viscosity is often used as an indication of molecular weight of the polysiloxane as exact number or weight average molecular weights of polysiloxane are often difficult to determine. The viscosity of the polysiloxanes useful in the present invention may be about 25 centipoise or greater, more specifically about 50 centipoise or greater, and most specifically about 100 centipoise or greater. The term "viscosity" as referred to herein refers to the viscosity of the neat polysiloxane itself and not to the viscosity of an emulsion if so delivered. It should also be understood that the polysiloxanes of the present invention may be delivered as solutions containing diluents. Such diluents may lower the viscosity of the polysiloxane solution below the limitations set above, however, the efficacious part of the polysiloxane should conform to the viscosity ranges given above. Examples of such diluents include, but is not limited to, oligomeric and cyclo-oligomeric polysiloxanes such as octamethylcyclotetrasiloxane, octamethyltrisiloxane, decamethylcyclopentasiloxane, decamethyltetrasiloxane and the like including mixtures of these compounds.

The polysiloxanes may be delivered as aqueous dispersions, emulsions, including microemulsions, stabilized by suitable surfactant systems that may confer a charge to the emulsion micelles. Nonionic, cationic, and anionic polysiloxane systems may be employed as long as the charge of the surfactant used to stabilize the emulsion does not cause phase separation and precipitation of the synthetic co-polymer from solution. As the synthetic co-polymers are cationic, cationic and nonionic emulsions are preferred. The polysiloxanes may also be delivered as neat fluids. It is possible to mix the neat polysiloxane fluids with the cationic synthetic co-polymer solution, dispersion or emulsion and then apply onto the surface of the cellulose fibers. In fact, several of the synthetic co-polymer solutions are effective in emulsifying the polysiloxanes.

In another aspect, the present invention resides in a soft, low lint and slough absorbent tissue sheet comprising a polysiloxane having a viscosity of about 25 centipoise or greater, the viscosity referred to herein as the viscosity of the neat polysiloxane and not to the viscosity of an emulsion if so delivered, and a cationic synthetic water dispersible synthetic co-polymer having the general structure:

Wherein:
$R^1$, $R^2$, $R^3$ are independently H; $C_{1-4}$ alkyl radicals; and, mixtures thereof.
$R^4$ is a $C_1$–$C_8$ alkyl radical or mixtures thereof.
$Z^1$ is a bridging radical attaching the $R^4$ functionality to the polymer backbone. Examples include, but are not limited to, —O—, —COO—, —OOC—, —CONH—, —NHCO—, and mixtures thereof.
$Q^1$ is a cationic functionality. One example of such a cationic functionality is a functional group containing a cationic quaternary ammonium radical.
$Q^2$ is an optional non-ionic hydrophilic or water soluble monomer (and mixtures thereof) incorporated into the synthetic co-polymer so as to make the synthetic co-polymer more hydrophilic. $Q^2$ possess limited ability to hydrogen or covalently bond to cellulose fibers, such bonding resulting in an increase in stiffness of the tissue sheet. Suitable hydrophilic monomers or water-soluble nonionic monomers for use in the cationic synthetic co-polymers of the present invention include, but are not limited to monomers, such as, hydroxyalkyl acrylates and hydroxyalkyl methacrylates, such as hydroxyethyl methacrylate (HEMA); hydroxyethyl acrylate; polyalkoxyl acrylates, such as polyethyleneglycol acrylates; and, polyalkoxyl methacrylates, such as polyethyleneglycol methacrylates ("PEG-MA"). Other suitable hydrophilic monomers or water-soluble nonionic monomers for use in the ion-sensitive cationic synthetic co-polymers of the present invention include, but are not limited to, diacetone acrylamide, N-vinylpyrrolidinone, N-vinylformamide, and mixtures thereof.

The mole ratio of z:x will specifically range from about 0:1 to about 4:1, more specifically from about 0:1 to about 1:1, and most specifically from about 0:1 to about 1:3. The mole ratio of (x+z):y may be from about 0.98:0.02 to about 1:1, most specifically from about 0.95:0.05 to about 0.70:0.30.

In another aspect, the present invention resides in a method of making a soft, low lint tissue sheet, comprising the steps of: (a) forming an aqueous suspension of papermaking fibers; (b) depositing the aqueous suspension of papermaking fibers onto a forming fabric to form a wet tissue sheet; (c) dewatering and drying the wet tissue sheet to form a dried tissue sheet; and, applying a polysiloxane composition topically to the formed tissue sheet, the polysiloxane composition comprising a polysiloxane and a cationic water dispersible synthetic co-polymer having the general structure:

Wherein:
$R^1$, $R^2$, $R^3$ are independently H; $C_{1-4}$ alkyl radicals; and, mixtures thereof.
$R^4$ is a $C_1$–$C_8$ alkyl radical or mixtures thereof.
$Z^1$ is a bridging radical attaching the $R^4$ functionality to the polymer backbone. Examples include, but are not limited to, —O—, —COO—, —OOC—, —CONH—, —NHCO—, and mixtures thereof.
$Q^1$ is a cationic functionality. One example of such a cationic functionality is a functional group containing a cationic quaternary ammonium radical.
$Q^2$ is an optional non-ionic hydrophilic or water soluble monomer (mixtures thereof) incorporated into the synthetic co-polymer so as to make the synthetic co-polymer more hydrophilic. $Q^2$ possess limited ability to hydrogen or covalently bond to cellulose fibers, such bonding resulting in an increase in stiffness of the tissue sheet. Suitable hydrophilic monomers or water-soluble nonionic monomers for use in the cationic synthetic co-polymers of the present invention include, but are not limited to monomers, such as, hydroxyalkyl acrylates and hydroxyalkyl methacrylates, such as hydroxyethyl methacrylate (HEMA); hydroxyethyl acrylate; polyalkoxyl acrylates, such as polyethyleneglycol acrylates; and, polyalkoxyl methacrylates, such as polyethyleneglycol methacrylates ("PEG-MA"). Other suitable hydrophilic monomers or water-soluble nonionic monomers for use in the cationic synthetic co-polymers of the present invention include, but are not limited to, diacetone acrylamide, N-vinylpyrrolidinone, N-vinylformamide, and mixtures thereof.

The mole ratio of z:x will specifically range from about 0:1 to about 4:1, more specifically from about 0:1 to about 1:1, and most specifically from about 0:1 to about 1:3. The mole ratio of (x+z):y may be from about 0.98:0.02 to about 1:1, most specifically from about 0.95:0.05 to about 0.70:0.30.

The ratio of the cationic synthetic co-polymer to polysiloxane may vary widely depending upon the desired effect in the tissue sheet or tissue product. In general, the amount of cationic synthetic co-polymer may range from about 2% by weight to about 90% by weight of polysiloxane on a dry solids basis. More specifically the amount of cationic synthetic co-polymer may range from about 5% to about 70% by weight of polysiloxane on a dry solids basis and still more specifically the amount of cationic synthetic co-polymer may range from about 10% to about 50% by weight of the polysiloxane on a dry solids basis.

Similarly, the amount of the polysiloxane composition comprising the polysiloxane and the cationic water dispersible synthetic co-polymer applied to the tissue sheet may vary widely depending upon the desired effect in the tissue sheet or tissue product. In general, the amount of polysiloxane composition comprising the polysiloxane and the cationic water dispersible synthetic co-polymer applied to the tissue sheet may range from about 0.05% to about 10% by weight of dry fibers on an active dry solids basis, more specifically from about 0.1% to about 6% by weight of dry fibers on an active dry solids basis, and still more specifically from about 0.2% to about 4% by weight of dry fibers on an active dry solids basis. The term "active dry solids basis" as herein used refers to the dry weight of polysiloxane plus dry weight of cationic synthetic co-polymer added to the tissue sheet. The term active dry solids basis specifically excludes any emulsifiers and surfactants that may be employed within the polysiloxane and binder composition.

The polysiloxane composition may be applied to the tissue sheet at any point after sheet formation. For example, the polysiloxane composition may be applied prior to the drying section of the tissue machine where the tissue sheet has a consistency of from about 10% to about 60%. In another embodiment, the polysiloxane composition may be applied in the drying section of the tissue machine where the tissue sheet has a consistency of about 30% to about 100%. In another embodiment of the present invention, the polysiloxane composition may be applied to the tissue sheet on the tissue machine after the drying section before the winder where the tissue sheet has a consistency of from about 90% to about 100%. The polysiloxane composition may also be applied via a secondary post treatment process where the tissue sheet has a consistency of from about 90% to about 100%. The particular method by which the polysiloxane composition is applied to the tissue sheet is not overly critical to the present invention. Any of the methods known in the art for topically applying materials to a formed tissue sheet are suitable for means of the present invention.

DETAILED DESCRIPTION OF THE INVENTION

While the present invention is applicable to any tissue sheet, the polysiloxane composition may be particularly useful for tissue and towel products. The terms "tissue products" and "towel products" as used herein are differentiated from other paper products in terms of their bulk. The bulk of the tissue products and towel products manufactured from the tissue sheets of the present invention is calculated as the quotient of the caliper (hereinafter defined), expressed in microns, divided by the basis weight, expressed in grams per square meter. The resulting bulk is expressed as cubic centimeters per gram. Writing papers, newsprint and other such papers have higher strength, stiffness and density (low bulk) in comparison to tissue and towel products which tend to have much higher calipers for a given basis weight. The tissue and towel products of the present invention have a bulk of about 2 cm³/g or greater, more specifically about 2.5 cm³/g or greater, and still more specifically about 3 cm³/g or greater.

Cationic Synthetic Co-Polymer Composition

The cationic synthetic co-polymers as described herein may be water soluble, organic soluble, or soluble in mixtures of water and water miscible organic compounds. Preferably, the synthetic co-polymers of the present invention are water-soluble or water dispersible but this is not a necessity of the present invention.

Suitable hydrophobic monomers for incorporating a hydrophobic aliphatic hydrocarbon functionality into the cationic synthetic co-polymers of the present invention include, but are not limited to, alkyl acrylates, methacrylates, acrylamides, methacrylamides, tiglates and crotonates, including butyl acrylate, butyl methacrylate, methyl acrylate, methyl methacrylate, ethyl acrylate, ethyl methacrylate, 1-Ethylhexyl tiglate, t-butyl acrylate, butyl crotonate, butyl tiglate, sec-Butyl tiglate, Hexyl tiglate, Isobutyl tiglate, hexyl crotonate, butyl crotonate, n-butyl acrylamide, t-butyl acrylamide, N-(Butoxymethyl) acrylamide, N-(Isobutoxymethyl)acrylamide, and the like including mixtures of the monomers all of which are known commercially available materials. Also known are various vinyl ethers including, but not limited to, n-butyl vinyl ether, 2-ethylhexyl vinyl ether, and the corresponding esters including vinyl pivalate, vinyl butyrate, 2-ethylhexanoate, and the like including mixtures of the monomers, all of which are suitable for incorporation of the hydrophobic aliphatic hydrocarbon moiety.

Suitable monomers for incorporating a cationic charge functionality into the synthetic co-polymer include, but are not limited to, [2-(methacryloyloxy)ethyl] trimethylammonium methosulfate (METAMS); dimethyl-diallyl ammonium chloride (DMDAAC); 3-acryloamido-3-methyl butyl trimethyl ammonium chloride (AMBTAC); trimethylamino methacrylate; vinyl benzyl trimethyl ammonium chloride (VBTAC); 2-[(acryloyloxy)ethyl] trimethylammonium chloride; and, [2(methacryloyloxy) ethyl]trimethylammonium chloride.

Examples of preferred cationic monomers for the cationic synthetic co-polymers of the present invention are [2-(methacryloyloxy)ethyl]trimethyl ammonium chloride; [2-(methacryloyloxy)ethyl]trimethyl ammonium methosulfate; and, [2-(methacryloyloxy)ethyl]trimethyl ammonium ethosulfate.

The cationic charge functionality may also be incorporated into the synthetic co-polymer through use of monomers having free secondary or tertiary amine group functionality. Examples of such monomers include, but is not limited to, N-(β-dimethylamino)ethyl acrylamide, N-(β-dimethylamino)ethyl acrylamide, diethylaminohexyl methacrylate, diethylaminoethyl vinyl ether, dimethylaminoethyl vinyl ether, 1-dimethylamino-2-propyl methacrylate, 4-vinylpyridine and the like. The cationic charge may be incorporated into the synthetic co-polymers either through quaternization with methylating agents such as methyl chloride, dimethyl sulfate, diethyl sulfate, and the like. Optionally, the cationic charge may be developed by simple acidification of the monomer or synthetic co-polymer containing the monomer units. To avoid potential sensitivity to pH, it may be desirable that the cationic charge be a quaternary ammonium group.

Suitable hydrophilic monomers or water-soluble nonionic monomers for use in the cationic synthetic co-polymers of the present invention include, but are not limited to, N- and N,N-substituted acrylamide and methacrylamide based monomers, such as N,N-dimethyl acrylamide, N-ethyl acrylamide, N-isopropyl acrylamide, and hydroxymethyl acrylamide; acrylate or methacrylate based monomers, such as, hydroxyalkyl acrylates; hydroxyalkyl methacrylates, such as hydroxyethyl methacrylate (HEMA); hydroxyethyl acrylate; polyalkoxyl acrylates, such as polyethyleneglycol acrylates; and, polyalkoxyl methacrylates, such as polyethyleneglycol methacrylates ("PEG-MA"). Other suitable hydrophilic monomers or water-soluble nonionic monomers for use in the ion-sensitive cationic synthetic co-polymers of the present invention include, but are not limited to, N-vinylpyrrolidinone and N-vinylformamide.

For the cationic synthetic co-polymers of the present invention the mole % of hydrophobic monomers will range from about 40 mole % to about 98 mole % of the total monomer composition, the amount of cationic monomers will range from about 2 mole % to about 50 mole % of the total monomer composition. The amount of optional hydrophilic monomers will range from about 0 mole % to about 58 mole % of the total monomer composition. More specifically, the mole percent of hydrophobic monomers is from about 50 mole % to about 95 mole % of the total monomer composition, the mole % of cationic monomers is most specifically from about 5 mole % to about 30 mole % of the total monomer composition, and the amount of optional hydrophilic monomers is most specifically from about 0 mole % to about 20 mole percent of the total monomer composition.

The synthetic co-polymers of the present invention may have an average molecular weight average molecular weight ranging from about 10,000 to about 5,000,000. More specifically, the synthetic co-polymers of the present invention have a weight average molecular weight ranging from about 20,000 to about 2,000,000, or, more specifically still, from about 30,000 to about 1,000,000.

Another advantage to the disclosed synthetic co-polymers is ability to produce tissue sheets having low stiffness due to relatively low glass transition temperatures. While the synthetic co-polymers of the present invention may have a wide range of glass transition temperature, the preferred glass transition temperature is about 100° C. or less, more specifically about 70° C. or less, and most specifically about 40° C. or less. Some of the synthetic co-polymers of the present invention may display 2 glass transition temperatures. In such cases the lower glass transition temperature is about 100° C. or less, more specifically about 70° C. or less, and most specifically about 40° C. or less The low glass transition temperatures combined with the compatibility of the synthetic co-polymers with the polysiloxane allow blends of the polysiloxane and the synthetic co-polymer to form films having very low modulus. Modulus measures the ease of deformation of the film by determining the amount of stress (force) needed to produce a certain amount of strain (deformation). The lower the modulus value, the more flexible the film as it can be deformed with very little force. In these formulations, a low modulus is desirable to avoid any increase in tissue sheet stiffness. Films are cast from the polysiloxane/synthetic co-polymer compositions and modulus tested via the procedure hereinafter described. The modulus values of the films is specifically about 5 MPa or less, more specifically about 3 MPa or less, still more specifically about 1 MPa or less, and most specifically about 0.8 MPa or less.

The synthetic co-polymers of the present invention may be prepared according to a variety of polymerization methods. In one embodiment the synthetic co-polymers are prepared via a solution polymerization method. Suitable solvents for the polymerization method include, but are not limited to, lower alcohols such as methanol, ethanol, and propanol; a mixed solvent comprising water and one or more lower alcohols mentioned above; and, a mixed solvent comprising water and one or more lower ketones such as acetone or methyl ethyl ketone. After the polymerization reaction is complete, the solvent is distilled from the synthetic co-polymer as water is introduced resulting in an aqueous dispersion, suspension or solution of the synthetic co-polymer essentially free from the solvent used in the polymerization.

Alternatively, the synthetic co-polymer formulations may also be delivered in emulsion form whereby an aqueous polymerization process is used in conjunction with a surfactant or set of surfactants. The surfactants may be cationic or non-ionic, but more specifically non-ionic.

In the polymerization methods which may be utilized in the present invention, any free radical polymerization initiator may be used. Selection of a particular initiator may depend on a number of factors including, but not limited to, the polymerization temperature, the solvent, and the monomers used. Suitable polymerization initiators for use in the present invention include, but are not limited to, 2,2'-azobisisobutyronitrile, 2,2'-azobis(2-methylbutyronitrile), 2,2'-azobis(2,4-dimethylyaleronitrile), 2,2'-azobis(2-amidinopropane)dihydrochloride, 2,2'-azobis(N,N'-dimethyleneisobutylamidine), potassium persulfate, ammonium persulfate, and aqueous hydrogen peroxide. The amount of polymerization initiator may desirably range from about 0.01 to about 5 weight percent based on the total weight of monomer present.

The polymerization temperature may vary depending on the polymerization solvent, monomers, surfactants, and polymerization initiator used, but in general, ranges from about 20° C. to about 90° C. The polymerization time generally ranges from about 2 to about 8 hours.

In order to be an effective cationic synthetic co-polymer or cationic synthetic co-polymer formulation suitable for use in tissue applications, the cationic synthetic co-polymer or cationic synthetic co-polymer formulation should desirably be (1) water soluble or water dispersible; (2) safe (not toxic); and (3) relatively economical. In addition to the foregoing factors, the cationic synthetic co-polymers or cationic synthetic co-polymer formulation of the present invention, when used as a binder composition for a tissue sheet, such as a facial, bath, or towel product should be (4) processable on a commercial basis; i.e., may be applied relatively quickly on a large scale basis, such as by spraying (which thereby requires that the binder composition have a relatively low viscosity at high shear); and, (5) provide acceptable levels of tissue sheet wettability. The cationic synthetic co-polymers and the cationic synthetic co-polymer formulations of the present invention and articles made therewith, especially facial tissue, bath tissue, and towels comprising the particular compositions set forth below, may meet many or all of the above criteria. Of course, it is not necessary for all of the advantages of the preferred embodiments of the present invention to be met to fall within the scope of the present invention.

Polysiloxanes

The polysiloxane composition of the present invention further comprises a polysiloxane component. The particular structure of the polysiloxane is not overly critical to the present invention so long as the polysiloxane provides the desired benefits to the tissue sheet or tissue product. Functional and non-functional polysiloxanes are suitable for mixing with the cationic synthetic co-polymer. Polysiloxanes encompass a very broad class of compounds. They are characterized in having the following backbone structure:

wherein R' and R" may be a broad range of organo and non-organo groups including mixtures of such groups and wherein n is an integer $\geq 2$. These polysiloxanes may be linear, branched or cyclic. They include a wide variety of polysiloxane co-polymers containing various compositions of functional groups, hence, R' and R" actually may represent many different types of groups within the same polymer molecule. The organo or non-organo groups may be capable of reacting with the cellulose fibers to covalently, ionically or hydrogen bond the polysiloxane to the cellulose fibers. These functional groups may also be capable of reacting with themselves to form crosslinked matrixes with the cellulose fibers. The scope of the present invention should not be construed as limited by a particular polysiloxane structure so long as that polysiloxane structure delivers the aforementioned softness benefits to the final tissue sheet or tissue product and so long as no detrimental interactions with the binders occur.

A specific class of polysiloxanes suitable for use in the present invention may have the general formula:

Wherein the $R^1$–$R^8$ moieties may be independently any organofunctional group including $C_1$ or higher alkyl groups, ethers, polyethers, polyesters, amines, imines, amides, or other functional groups including the alkyl and alkenyl analogues of such groups and y is an integer >1. Specifically, the $R^1$–$R^8$ moieties are independently any $C_1$ or higher alkyl group including mixtures of the alkyl groups. Exemplary fluids are the DC-200 fluid series, manufactured and sold by Dow Corning, Inc.

Functionalized polysiloxanes and their aqueous emulsions are known commercially available materials. Polysiloxanes having the following structure are well suited for the purposes of the present invention and are known in the art and available:

Wherein, x and y are integers >0. The mole ratio of x to (x+y) may be from about 0.005 percent to about 25 percent. The $R^1$–$R^9$ moieties may be independently any organofunctional group including $C_1$ or higher alkyl groups, ethers, polyethers, polyesters, amines, imines, amides, or other functional groups including the alkyl and alkenyl analogues of such groups. The $R^{10}$ moiety is an amino functional moiety including, but not limited to, primary amine, secondary amine, tertiary amines, quaternary amines, unsubstituted amides, and mixtures thereof. An exemplary $R^{10}$ moiety contains one amine group per constituent or two or more amine groups per substituent, separated by a linear or branched alkyl chain of $C_1$ or greater.

Another exemplary class of functionalized polysiloxanes is the polyether polysiloxanes. Such polysiloxanes are also known and are usually incorporated wholly or in part with other functional polysiloxanes as a means of improving hydrophilicity of the silicone treated tissue sheet or tissue product. Such polysiloxanes will generally have the following structure:

Wherein, x and z are integers >0. y is an integer $\geq 0$. The mole ratio of x to (x+y+z) may be from about 0.05 percent to about 95 percent. The ratio of y to (x+y+z) may be from about 0 percent to about 25%. The $R^0$–$R^9$ moieties may be independently any organofunctional group including $C_1$ or higher alkyl groups, ethers, polyethers, polyesters, amines, imines, amides, or other functional groups including the alkyl and alkenyl analogues of such groups. The $R^{10}$ moiety is an amino functional moiety including, but not limited to, primary amine, secondary amine, tertiary amines, quaternary amines, unsubstituted amides and mixtures thereof. An exemplary $R^{10}$ moiety contains one amine group per constituent or two or more amine groups per substituent, separated by a linear or branched alkyl chain of $C^1$ or greater. $R^{11}$ is a polyether functional group having the generic formula: $-R^{12}-(R^{13}-O)_a-(R^{14}-O)_b-R^{15}$, wherein $R^{12}$, $R^{13}$, and $R^{14}$ are independently $C_{1-4}$ alkyl groups, linear or branched; $R^{15}$ may be H or a $C_{1-30}$ alkyl group; and, "a" and "b" are integers of from about 1 to about 100, more specifically from about 5 to about 30. Exemplary aminofunctional polysiloxanes are the Wetsoft CTW family manufactured and sold by Wacker, Inc. Other exemplary polysiloxanes are disclosed in U.S. Pat. No. 6,432,270, issued on Aug. 13, 2002 to Liu et. al, the disclosure of which is incorporated herein by reference to the extent that it is non-contradictory herewith.

The application of the polysiloxane/synthetic co-polymer composition to the tissue sheet can be done via any method known in the art including but not limited to:

A spray applied to fibrous tissue sheet. For example, spray nozzles may be mounted over a moving wet tissue sheet to apply a desired dose of a synthetic co-polymer or synthetic co-polymer formulation to the wet tissue sheet. Nebulizers may also be used to apply a light mist to a surface of a wet tissue sheet.

Non-contact printing methods such as ink jet printing, digital printing of any kind, and the like.

Coating onto one or both surfaces of the wet tissue sheet, such as blade coating, air knife coating, short dwell coating, cast coating, and the like.

Extrusion from a die head such as UFD spray tips, such as available from ITW-Dynatec of Henderson, Tenn., of the polysiloxane composition in the form of a solution, a dispersion or emulsion, or a viscous mixture.

Impregnation of the wet tissue sheet with a solution or slurry, wherein the polysiloxane composition penetrates a significant distance into the thickness of the wet tissue sheet, such as more than 20% of the thickness of the wet tissue sheet, more specifically at least about 30% and most specifically at least about 70% of the thickness of the wet tissue sheet, including completely penetrating the wet tissue sheet throughout the full extent of its thickness. One useful method for impregnation of a wet tissue sheet is the Hydra-Sizer® system, produced by Black Clawson Corp., Watertown, N.Y., as described in "New Technology to Apply Starch and Other Additives," Pulp and Paper Canada, 100 (2): T42–T44 (February 1999). This system consists of a die, an adjustable support structure, a catch pan, and an additive supply system. A thin curtain of descending liquid or slurry is created which contacts the moving tissue sheet beneath it. Wide ranges of applied doses of the coating material are said to be achievable with good runnability. The system may also be applied to curtain coat a relatively dry tissue sheet, such as a tissue sheet just before or after creping.

Foam application of the polysiloxane composition to the wet fibrous tissue sheet (e.g., foam finishing), either for topical application or for impregnation of the compound into the tissue sheet under the influence of a pressure differential (e.g., vacuum-assisted impregnation of the foam). Principles of foam application of additives such as binder agents are described in U.S. Pat. No. 4,297,860, issued on Nov. 3, 1981 to Pacifici et al. and U.S. Pat. No. 4,773,110, issued on Sep. 27, 1988 to G. J. Hopkins, the disclosures of both which are herein incorporated by reference to the extent that they are non-contradictory herewith.

Application of the polysiloxane composition by spray or other means to a moving belt or fabric which in turn contacts the tissue sheet to apply the chemical to the tissue sheet, such as is disclosed in WO 01/49937 under the name of S. Eichhorn, published on Jun. 12, 2001.

The cellulosic tissue sheet to be treated may be made by any method known in the art. The tissue sheet may be wetlaid, such as tissue sheet formed with known papermaking techniques wherein a dilute aqueous fiber slurry is disposed on a moving wire to filter out the fibers and form an embryonic tissue sheet which is subsequently dewatered by combinations of units including suction boxes, wet presses, dryer units, and the like. Examples of known dewatering and other operations are given in U.S. Pat. No. 5,656,132, issued on Aug. 12, 1997 to Farrington et al. Capillary dewatering may also be applied to remove water from the tissue sheet, as disclosed in U.S. Pat. No. 5,598,643, issued on Feb. 4, 1997 and U.S. Pat. No. 4,556,450, issued on Dec. 3, 1985, both to S. C. Chuang et al., the disclosures of both which are herein incorporated by reference to the extent that they are non-contradictory herewith.

Drying operations may include drum drying, through drying, steam drying such as superheated steam drying, displacement dewatering, Yankee drying, infrared drying, microwave drying, radiofrequency drying in general, and impulse drying, as disclosed in U.S. Pat. No. 5,353,521, issued on Oct. 11, 1994 to Orloff and U.S. Pat. No. 5,598,642, issued on Feb. 4, 1997 to Orloff et al., the disclosures of both which are herein incorporated by reference to the extent that they are non-contradictory herewith. Other drying technologies can be used, such as methods employing differential gas pressure include the use of air presses as disclosed U.S. Pat. No. 6,096,169, issued on Aug. 1, 2000 to Hermans et al. and U.S. Pat. No. 6,143,135, issued on Nov. 7, 2000 to Hada et al., the disclosures of both which are herein incorporated by reference to the extent they are non-contradictory herewith. Also relevant are the paper machines disclosed in U.S. Pat. No. 5,230,776, issued on Jul. 27, 1993 to I. A. Andersson et al.

For tissue sheets, both creped and uncreped methods of manufacture can be used. Uncreped tissue production is disclosed in U.S. Pat. No. 5,772,845, issued on Jun. 30, 1998 to Farrington, Jr. et al., the disclosure of which is herein incorporated by reference to the extent it is non-contradictory herewith. Creped tissue production is disclosed in U.S. Pat. No. 5,637,194, issued on Jun. 10, 1997 to Ampulski et al.; U.S. Pat. No. 4,529,480, issued on Jul. 16, 1985 to Trokhan; U.S. Pat. No. 6,103,063, issued on Aug. 15, 2000 to Oriaran et al.; and, U.S. Pat. No. 4,440,597, issued on Apr. 3, 1984 to Wells et al., the disclosures of all of which are herein incorporated by reference to the extent that they are non-contradictory herewith. Also suitable for application of the above mentioned synthetic co-polymers are tissue sheets that are pattern densified or imprinted, such as the webs disclosed in any of the following U.S. Patents: U.S. Pat. No. 4,514,345, issued on Apr. 30, 1985 to Johnson et al.; U.S. Pat. No. 4,528,239, issued on Jul. 9, 1985 to Trokhan; U.S. Pat. No. 5,098,522, issued on Mar. 24, 1992; U.S. Pat. No. 5,260,171, issued on Nov. 9, 1993 to Smurkoski et al.; U.S. Pat. No. 5,275,700, issued on Jan. 4, 1994 to Trokhan; U.S. Pat. No. 5,328,565, issued on Jul. 12, 1994 to Rasch et al.; U.S. Pat. No. 5,334,289, issued on Aug. 2, 1994 to Trokhan et al.; U.S. Pat. No. 5,431,786, issued on Jul. 11, 1995 to Rasch et al.; U.S. Pat. No. 5,496,624, issued on Mar. 5, 1996 to Steltjes, Jr. et al.; U.S. Pat. No. 5,500,277, issued on Mar. 19, 1996 to Trokhan et al.; U.S. Pat. No. 5,514,523, issued on May 7, 1996 to Trokhan et al.; U.S. Pat. No. 5,554,467, issued on Sep. 10, 1996 to Trokhan et al.; U.S. Pat. No. 5,566,724, issued on Oct. 22, 1996 to Trokhan et al.; U.S. Pat. No. 5,624,790, issued on Apr. 29, 1997 to Trokhan et al.; and, U.S. Pat. No. 5,628,876, issued on May 13, 1997 to Ayers et al., the disclosures of all of which are herein incorporated by reference to the extent that they are non-contradictory herewith. Such imprinted tissue sheets may have a network of densified regions that have been imprinted against a drum dryer by an imprinting fabric, and regions that are relatively less densified (e.g., "domes" in the tissue sheet) corresponding to deflection conduits in the imprinting fabric, wherein the tissue sheet superposed over the deflection conduits was deflected by an air pressure differential across the deflection conduit to form a lower-density pillow-like region or dome in the tissue sheet.

Optional Chemical Additives

Optional chemical additives may also be added to the aqueous papermaking furnish or to the embryonic tissue sheet to impart additional benefits to the tissue product and tissue-making process and are not antagonistic to the intended benefits of the present invention. The following materials are included as examples of additional chemicals that may be applied to the tissue sheet with the polysiloxanes and the synthetic co-polymers of the present invention. The chemicals are included as examples and are not intended to limit the scope of the present invention. Such chemicals may be added at any point in the papermaking process, before, after, or concurrent with addition of the polysiloxane compositions of the present invention. They may also be added simultaneously with the polysiloxane composition, wherein the chemical additive or additives are blended directly with the polysiloxane composition of the present invention so long as such chemical additives do not interact with the polysiloxane composition in a manner that precludes topical application to the tissue sheet.

Charge Control Agents

Charge promoters and control agents are commonly used in the papermaking process to control the zeta potential of the papermaking furnish in the wet end of the process. These species may be anionic or cationic, most usually cationic, and may be either naturally occurring materials such as alum or low molecular weight high charge density synthetic polymers typically of molecular weight of about 500,000 or less. Drainage and retention aids may also be added to the furnish to improve formation, drainage and fines retention. Included within the retention and drainage aids are microparticle systems containing high surface area, high anionic charge density materials.

Strength Additives

Wet and dry strength agents may also be applied to the tissue sheet. As used herein, "wet strength agents" are materials used to immobilize the bonds between fibers in the wet state. Typically, the means by which fibers are held together in tissue sheets and tissue products involve hydrogen bonds and sometimes combinations of hydrogen bonds and covalent and/or ionic bonds. In the present invention, it may be useful to provide a material that will allow bonding of fibers in such a way as to immobilize the fiber-to-fiber bond points and make them resistant to disruption in the wet state. In this instance, the wet state usually will mean when the tissue product is largely saturated with water or other aqueous solutions, but could also mean significant saturation with body fluids such as urine, blood, mucus, menses, runny bowel movement, lymph and other body exudates.

Any material that when added to a tissue sheet results in providing the tissue sheet with a mean wet geometric tensile strength:dry geometric tensile strength ratio in excess of about 0.1 will, for purposes of the present invention, be termed a wet strength agent. Typically these materials are termed either as permanent wet strength agents or as "temporary" wet strength agents. For the purposes of differentiating permanent wet strength agents from temporary wet strength agents, the permanent wet strength agents will be defined as those resins which, when incorporated into tissue sheets or tissue products, will provide a tissue product that retains more than 50% of its original wet strength after exposure to water for a period of at least five minutes. Temporary wet strength agents are those which show less than 50% of their original wet strength after being saturated with water for five minutes. Both classes of wet strength agents find application in the present invention. The amount of wet strength agent added to the pulp fibers can be at least about 0.1 dry weight percent, more specifically about 0.2 dry weight percent or greater, and still more specifically from about 0.1 to about 3 dry weight percent, based on the dry weight of the fibers.

Permanent wet strength agents will provide a more or less long-term wet resilience to the structure of a tissue sheet. In contrast, the temporary wet strength agents will typically provide tissue sheet structures that had low density and high resilience, but would not provide a tissue sheet structure that had long-term resistance to exposure to water or body fluids.

Wet and Temporary Wet Strength Additives

Temporary wet strength additives can be cationic, nonionic or anionic. Exemplary compounds include PAREZ™ 631 NC and PAREZ® 725 temporary wet strength resins that are cationic glyoxylated polyacrylamides available from Cytec Industries (West Paterson, N.J.). This and similar resins are described in U.S. Pat. No. 3,556,932 and U.S. Pat. No. 3,556,933, issued on January, 1971 to Coscia, et. al. Hercobond 1366, manufactured by Hercules, Inc. (Wilmington, Del.) is another commercially available cationic glyoxylated polyacrylamide that can be used according to the present invention. Additional examples of temporary wet strength additives include dialdehyde starches such as Cobond 1000® from National Starch and Chemical Company and other aldehyde containing polymers such as those described in U.S. Pat. No. 6,224,714, issued on May 1, 2001 to Schroeder et al.; U.S. Pat. No. 6,274,667, issued on Aug. 14, 2001 to Shannon et al.; U.S. Pat. No. 6,287,418, issued on Sep. 11, 2001 to Schroeder et al.; and, U.S. Pat. No. 6,365,667, issued on Apr. 2, 2002 to Shannon et al., the disclosures of all of which are herein incorporated by reference to the extent that they are non-contradictory herewith.

Permanent wet strength agents comprising cationic oligomeric or polymeric resins may be used in the present invention. Polyamide-polyamine-epichlorohydrin type resins such as KYMENE 557H sold by Hercules, Inc. located at Wilmington, Del. are the most widely used permanent wet-strength agents and are suitable for use in the present invention. Such materials have been described in the following U.S. Pat. No. 3,700,623, issued on Oct. 24, 1972 to Keim; U.S. Pat. No. 3,772,076, issued on Nov. 13, 1973 to Keim; U.S. Pat. No. 3,855,158, issued on Dec. 17, 1974 to Petrovich et al.; U.S. Pat. No. 3,899,388, issued on Aug. 12, 1975 to Petrovich et al.; U.S. Pat. No. 4,129,528, issued on Dec. 12, 1978 to Petrovich et al.; U.S. Pat. No. 4,147,586, issued on Apr. 3, 1979 to Petrovich et al.; and, U.S. Pat. No. 4,222,921, issued on Sep. 16, 1980 to van Eenam. Other cationic resins include polyethylenimine resins and aminoplast resins obtained by reaction of formaldehyde with melamine or urea. It is often advantageous to use both permanent and temporary wet strength resins in the manufacture of tissue products with such use being recognized as falling within the scope of the present invention.

Dry Strength Additives

Dry strength resins may also be applied to the tissue sheet without affecting the performance of the disclosed polysiloxanes and cationic synthetic co-polymers of the present invention. Such materials are well known in the art and include, but are not limited to, modified starches and other polysaccharides such as cationic, amphoteric, and anionic starches and guar and locust bean gums, modified polyacrylamides, carboxymethylcellulose, sugars, polyvinyl alcohol, chitosan, and the like. Such dry strength additives are typically added to the fiber slurry prior to tissue sheet formation or as part of the creping package. It may at times, however, be beneficial to blend the dry strength resin with the cationic synthetic co-polymers and polysiloxanes of the present invention and apply the chemicals simultaneously to the tissue sheet.

Additional Softness Additives

At times it may be advantageous to add additional debonders or softening chemistries to the tissue sheet. Examples of such debonders and softening chemistries are broadly taught in the art. Exemplary compounds include the simple quaternary ammonium salts having the general formula $(R^{1'})_{4-b}-N^+-(R^{1''})_b X^-$ wherein R1' is a $C_{1-8}$ alkyl group, R1" is a $C_{14}-C_{22}$ alkyl group, b is an integer from 1 to 3 and $X^-$ is any suitable counterion. Other similar compounds include the monoester, diester, monoamide and diamide derivatives of the simple quaternary ammonium salts. A number of variations on these quaternary ammonium compounds are known and should be considered to fall within the scope of the present invention. Additional softening compositions include cationic oleyl imidazoline materials such as methyl-1-oleyl amidoethyl-2-oleyl imidazo linium methylsulfate commercially available as Mackernium CD-183 from McIntyre Ltd., located in University Park, Ill. and Prosoft TQ-1003 available from Hercules, Inc. Such softeners may also incorporate a humectant or a plasticizer such as a low molecular weight polyethylene glycol (molecular weight of about 4,000 daltons or less) or a polyhydroxy compound such as glycerin or propylene glycol. These softeners may be applied to the fibers while in slurry prior to tissue sheet formation to aid in bulk softness. Additional bulk softening agents suitable for addition to the slurry of pulp fibers include cationic polysiloxanes such as those described in U.S. Pat. No. 5,591,306, issued on Jan. 7, 1997 to Kaun and U.S. Pat. No. 5,725,736, issued on Mar. 10, 1998 to Schroeder, the disclosures of both which are herein incorporated by reference to the extent that they are non-contradictory herewith and the cationic synthetic co-polymers of the present invention. At times, it may be advantageous to add such secondary softening agents simultaneously with the polysiloxane compositions of the present invention. In such cases, solutions or emulsions of the softening composition and polysiloxane composition are blended directly and then topically applied to the tissue sheet.

Miscellaneous Agents

Additional types of chemicals that may be added to the tissue sheet include, but is not limited to, absorbency aids usually in the form of cationic, anionic, or non-ionic surfactants, humectants and plasticizers such as low molecular weight polyethylene glycols and polyhydroxy compounds such as glycerin and propylene glycol. Materials that supply skin health benefits such as mineral oil, aloe extract, vitamin e and the like may also be incorporated into the tissue sheet, preferably applied simultaneously with the polysiloxane compositions of the present invention.

In general, the polysiloxanes and the cationic synthetic co-polymers of the present invention may be used in conjunction with any known materials and chemicals that are not antagonistic to its intended use. Examples of such materials include, but are not limited to, odor control agents, such as odor absorbents, activated carbon fibers and particles, baby powder, baking soda, chelating agents, zeolites, perfumes or other odor-masking agents, cyclodextrin compounds, oxidizers, and the like. Superabsorbent particles, synthetic fibers, or films may also be employed. Additional options include cationic dyes, optical brighteners, humectants, emollients and the like. A wide variety of other materials and chemicals known in the art of tissue-making processes may be included in the tissue sheet of the present invention.

The application point for said materials and chemicals is not particularly relevant to the present invention and such materials and chemicals may be applied at any point in the tissue manufacturing process. This includes pre treatment of pulp, application in the wet end of the process, post treatment after drying but on the tissue machine and topical post treatment.

Experimental

Basis Weight Determination (Tissue)

The basis weight and bone dry basis weight of the tissue sheet specimens was determined using a modified TAPPI T410 procedure. As is basis weight samples were conditioned at 23° C.±1° C. and 50±2% relative humidity for a minimum of 4 hours. After conditioning a stack of 16-3"X 3" samples was cut using a die press and associated die. This represents a tissue sheet sample area of 144 in². Examples of suitable die presses are TMI DGD die press manufactured by Testing Machines, Inc., Islandia, N.Y., or a Swing Beam testing machine manufactured by USM Corporation, Wilmington, Mass. Die size tolerances are ±0.008 inches in both directions. The specimen stack is then weighed to the nearest 0.001 gram on a tared analytical balance. The basis weight in pounds per 2880 ft² is then calculated using the following equation:

Basis weight=stack wt. in grams/454*2880

The bone dry basis weight is obtained by weighing a sample can and sample can lid the nearest 0.001 grams (this weight is A). The sample stack is placed into the sample can and left uncovered. The uncovered sample can and stack along with the sample can lid is placed in a 105° C.±2° C. oven for a period of 1 hour±5 minutes for sample stacks weighing less than 10 grams and at least 8 hours for sample stacks weighing 10 grams or greater. After the specified oven time has lapsed, the sample can lid is placed on the sample can and the sample can is removed from the oven. The sample can is allowed to cool to approximately ambient temperature but no more than 10 minutes. The sample can, sample can lid and sample stack are then weighed to the nearest 0.001 gram (this weight is C). The bone dry basis weight in pounds/2880 ft$^2$ is calculated using the following equation:

$$\text{Bone Dry BW} = (C-A)/454*2880$$

Dry Tensile (Tissue):

The Geometric Mean Tensile (GMT) strength test results are expressed as grams-force per 3 inches of sample width. GMT is computed from the peak load values of the MD (machine direction) and CD (cross-machine direction) tensile curves, which are obtained under laboratory conditions of 23.0° C.±10° C., 50.0±2.0% relative humidity, and after the tissue sheet has equilibrated to the testing conditions for a period of not less than four hours. Testing is conducted on a tensile testing machine maintaining a constant rate of elongation, and the width of each specimen tested was 3 inches. The "jaw span" or the distance between the jaws, sometimes referred to as gauge length, is 2.0 inches (50.8 mm). The crosshead speed is 10 inches per minute (254 mm/min.) A load cell or full-scale load is chosen so that all peak load results fall between 10 and 90 percent of the full-scale load. In particular, the results described herein were produced on an Instron 1122 tensile frame connected to a Sintech data acquisition and control system utilizing IMAP software running on a "486 Class" personal computer. This data system records at least 20 load and elongation points per second. A total of 10 specimens per sample are tested with the sample mean being used as the reported tensile value. The geometric mean tensile is calculated from the following equation:

$$GMT = (MD \text{ Tensile} * CD \text{ Tensile})^{1/2}$$

To account for small variations in basis weight, GMT values were then corrected to the 18.5 pounds/2880 ft$^2$ target basis weight using the following equation:

$$\text{Corrected } GMT = \text{Measured } GMT * (18.5/\text{Bone Dry Basis Weight})$$

Figure 1:
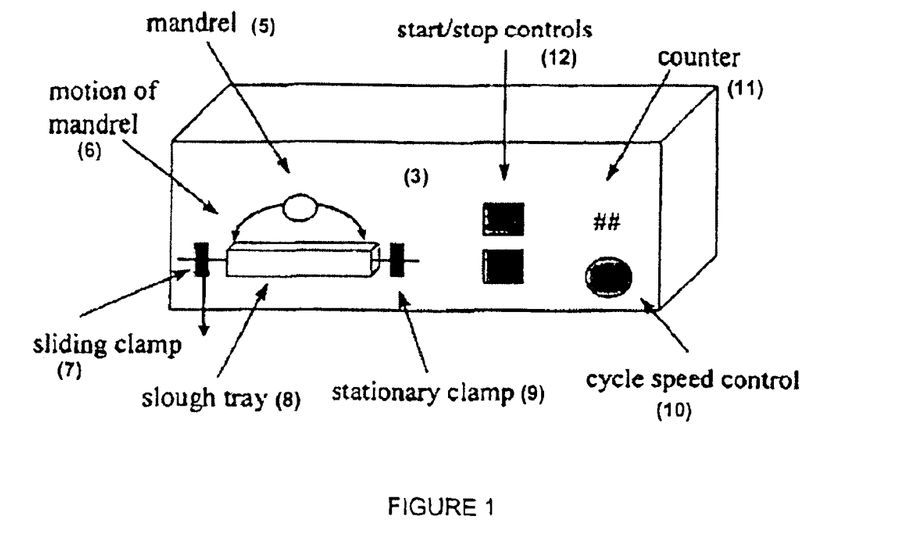
FIG. 1 is a schematic diagram of testing equipment used to measure lint and slough.

Lint and Slough Measurement:

In order to determine the abrasion resistance, or tendency of the fibers to be rubbed from the tissue sheet when handled, each sample was measured by abrading the tissue specimens via the following method. This test measures the resistance of a material to an abrasive action when the material is subjected to a horizontally reciprocating surface abrader. The equipment and method used is similar to that described in U.S. Pat. No. 4,326,000, issued on Apr. 20, 1982 to Roberts, Jr. and assigned to the Scott Paper Company, the disclosure of which is herein incorporated by reference to the extent that it is non-contradictory herewith. All tissue sheet samples were conditioned at 23° C.±1° C. and 50±2% relative humidity for a minimum of 4 hours. FIG. 1 is a schematic diagram of the test equipment. Shown is the abrading spindle or mandrel 5, a double arrow 6 showing the motion of the mandrel 5, a sliding clamp 7, a slough tray 8, a stationary clamp 9, a cycle speed control 10, a counter 11, and start/stop controls 12.

The abrading spindle 5 consists of a stainless steel rod, 0.5" in diameter with the abrasive portion consisting of a 0.005" deep diamond pattern knurl extending 4.25" in length around the entire circumference of the rod. The abrading spindle 5 is mounted perpendicularly to the face of the instrument 3 such that the abrasive portion of the abrading spindle 5 extends out its entire distance from the face of the instrument 3. On each side of the abrading spindle 5 is located a pair of clamps 7 and 9, one movable 7 and one fixed 9, spaced 4" apart and centered about the abrading spindle 5. The movable clamp 7 (weighing approximately 102.7 grams) is allowed to slide freely in the vertical direction, the weight of the movable clamp 7 providing the means for insuring a constant tension of the tissue sheet sample over the surface of the abrading spindle 5.

Using a JDC-3 or equivalent precision cutter, available from Thwing-Albert Instrument Company, located at Philadelphia, Pa., the tissue sheet sample specimens are cut into 3"±0.05" wide×7" long strips (note: length is not critical as long as specimen can span distance so as to be inserted into the clamps A & B). For tissue sheet samples, the MD direction corresponds to the longer dimension. Each tissue sheet sample is weighed to the nearest 0.1 mg. One end of the tissue sheet sample is clamped to the fixed clamp 9, the sample then loosely draped over the abrading spindle or mandrel 5 and clamped into the sliding clamp 7. The entire width of the tissue sheet sample should be in contact with the abrading spindle 5. The sliding clamp 7 is then allowed to fall providing constant tension across the abrading spindle 5.

The abrading spindle 5 is then moved back and forth at an approximate 15 degree angle from the centered vertical centerline in a reciprocal horizontal motion against the tissue sheet sample for 20 cycles (each cycle is a back and forth stroke), at a speed of 170 cycles per minute, removing loose fibers from the surface of the tissue sheet sample. Additionally the spindle rotates counter clockwise (when looking at the front of the instrument) at an approximate speed of 5 RPMs. The tissue sheet sample is then removed from the jaws 7 and 9 and any loose fibers on the surface of the tissue sheet sample are removed by gently shaking the tissue sheet sample. The tissue sheet sample is then weighed to the nearest 0.1 mg and the weight loss calculated. Ten tissue sheet specimen per sample are tested and the average weight loss value in mg recorded. The result for each tissue sheet sample was compared with a control sample containing no chemicals. Where a 2-layered tissue sheet sample is measured, placement of the tissue sheet sample should be such that the hardwood portion is against the abrading surface.

Caliper:

The term "caliper" as used herein is the thickness of a single tissue sheet, and may either be measured as the thickness of a single tissue sheet or as the thickness of a stack of ten tissue sheets and dividing the ten tissue sheet thickness by ten, where each sheet within the stack is placed with the same side up. Caliper is expressed in microns. Caliper was measured in accordance with TAPPI test methods T402 "Standard Conditioning and Testing Atmosphere For Paper, Board, Pulp Handsheets and Related Products" and T411 om-89 "Thickness (caliper) of Paper, Paperboard, and Combined Board" optionally with Note 3 for stacked tissue sheets. The micrometer used for carrying out T411 om-89 is a Bulk Micrometer (TMI Model 49-72-00, Amityville, N.Y.) or equivalent having an anvil diameter of 4 1/16 inches (103.2 millimeters) and an anvil pressure of 220 grams/square inch (3.3 g kilo Pascals).

Film Modulus

The polysiloxane emulsion or fluid and the binder were separately diluted to 5% active dry solids with distilled water. The polysiloxane aqueous emulsion or solution was then mixed with the appropriate amount of resin binder aqueous solution, dispersion or emulsion to give the desired dry weight ratios of polysiloxane and binder. The blend was mixed under moderate sheer conditions for about 5 minutes. About 100 mls. of the blended polysiloxane/synthetic co-polymer composition was then placed in a large plastic weigh boat having a recessed portion having an upper square exterior dimension of 130 mm×130 mm tapering to a circular bottom having a diameter of about 114 mm. The height of the recessed portion was 25 mm. The boat was then placed in a fume hood for 3 days at about 70° F. to about 75° F. until the excess water evaporated off and a film formed.

The tensile strength and film modulus were measured using a Sintech tensiometer model 1/D made by MTS Systems Corporation located in Eden Prairie, Minn. and the program TestWorks 5.0. The polymer film samples were cut using a "dog bone" shaped die-cut. The dog bone is 2.5" long overall, 3/8" wide at the widest part, tapering to 1/8" wide×0.5" long section in the middle of the bar. The caliper was measured using an electronic micrometer, model 293-676 made by Mitutoyo Measurement Technology, located in Andover, Hampshire, U.K. The thickness was measured in three different spots and averaged. The average thickness was then input into the computer program. The tensile was measured by determining the force at break; modulus was calculated by the computer program from the film thickness and the slope of the stress-strain curve.

The following machine parameters were used:

Specimen Inputs:
  Specimen width at narrowest point in mm. (3.18 mm)
  Caliper in mils (or appropriate unit per instrument requirements)

Calculations Inputs:
  Gage Length1: 18 mm (Optional)

Test Inputs:
  Crosshead Speed: 5.00 In/min
  Load Limit Hi: 25 Lb

Softness

Panel Softness

Softness of tissue sheets and/or tissue products is determined from sensory panel testing. The testing is performed by trained panelists who rub the formed tissue sheets and/or tissue products and compare the softness attributes of the tissue sheets and/or tissue products to the same softness attributes of high and low softness control standards. After comparing these characteristics to the standards, the panelists assign a value for each of the tissue sheets' and/or tissue products' softness attributes. From these values an overall softness of the tissue sheets and/or tissue products determined on a scale from 1 (least soft) to 16 (most soft). The higher the number, the softer the tissue sheet and/or tissue product. In general, a difference of less than 0.5 in the panel softness value is not statistically significant.

Sensory Softness

Sensory softness is an assessment of tissue sheet in-hand feel softness. This panel is lightly trained so as to provide assessments closer to those a consumer might provide. The strength lies in its generalizability to the consumer population. This softness measure is employed when the purpose is to obtain a holistic overview of attributes of the tissue sheets and to determine if differences in the tissue sheets are humanly perceivable.

The following is the specific softness procedure the panelists utilize while evaluating sensory softness for bath, facial and towel products. Samples of tissue sheets or tissue products are placed across the non-dominant arm with the coded side facing up. The pads of the thumb, index, and middle fingers of the dominant hand are then moved in a circular motion lightly across several areas of the sample. The velvety, silky, and fuzzy feel of the samples of the tissue sheets or tissue products is evaluated. Both sides of the samples are evaluated in the same manner. The procedure is then repeated for each additional sample. The samples are then ranked by the analyst from least to most soft.

The sensory softness data results are analyzed using a Freidman Two-Way Analysis of Variance (ANOVA) by Ranks. This analysis is a non-parametric test used for ranking data. The purpose is to determine if there is a difference between different experimental treatments. If there is not a ranking difference between the different experimental treatments, it is reasoned that the median response for one treatment is not statistically different than the median response of the other treatment, or any difference is caused by chance.

Sensory softness is assessed by between 10 to 12 panelists applying a rank order paradigm with no replications. For each individual attribute, approximately 24–72 data points are generated. A maximum of six codes may be ranked at one time. More codes may be assessed in multiple studies using a control code to provide a common reference if codes are to be compared across multiple studies.

Sensory softness is employed when it is desirable to obtain a holistic assessment of softness or to determine if sample differences are humanly perceivable. This panel is gently trained to provide assessments closer to those a consumer might provide. Sensory softness is useful for obtaining a read as to whether a sample change is humanly detectable and/or affects the softness perception. The data is presented in rank format. Therefore, the data may be used to make relative comparisons within a study as a sample's ranking is dependent upon the samples it is ranked with.

Panel Slough

Panel slough determines the tissue's slough performance of the tissue sheet in a simulated use setting. A group of highly trained panelists is used to provide slough information on tissue sheets, such as bath and facial products. Specific procedures are used for tissue sheets with the objective to select the tissue sheet with the most tissue particles (rolls, cigars) remaining on the tissue sheet. The analysis is in the form of a paired comparison.

Panel slough data is analyzed using a binomial analysis for paired-comparison data. A higher frequency count on any given attribute is indicative of higher discriminating ability. While this does not provide a measure of intensity, it does represent the frequency of how often a code of tissue sheets was chosen as having more of a given attribute than the other codes of tissue sheets it was compared against. 10 to 12 panelists evaluate tissue sheets in a paired-comparison paradigm with 2–4 replications, depending on the number of submitted tissue sheet test codes. Aggregated frequency data is analyzed through the use of a binomial procedure. For each individual attribute, approximately 48–756 data points are generated.

Panel slough testing has the ability to provide realism as to the context in which a tissue product made from a tissue sheet is consumed. Differences not detectable by the panel slough testing are found generally not be detectable by the general population.

Bath tissue product is specifically tested according to the following procedure. Four continuous bath tissue sheets are removed from the test bath tissue product. The tissue sheet is folded in half at the perforation, with the Topside of the tissue sheet facing out. The tissue sheet is folded in half again. This procedure is repeated with the other sample of the tissue sheet. The fold tissue sheets are placed on the testing surface with folded side toward the tester. The edges of the tissue sheets are held down with one hand. Using the side of the thumb, the center of the tissue sheet is wiped in a circular motion for 5 complete rotations. This procedure is replicated for the second sample of the tissue sheet. The amount of tissue particles (rolls, cigars) remaining on the surface of each tissue sheet is evaluated.

Facial tissue product is specifically tested according to the following procedure. One tissue sheet of each test facial tissue product is removed. The tissue sheet is wrapped around the index and middle finger of the dominant hand, using only one layer of the tissue sheet. The tissue sheet is wiped on the outer forearm of the non-dominant arm, covering an area the size of a quarter. Angle wipes toward your body using a back and forth motion for three complete wipes. Repeat this procedure with the other sample of the tissue sheet. Using a black background as a backdrop, the arm is viewed and the amount of tissue particles (rolls, cigars) remaining on the surface of each tissue sheet is evaluated.

EXAMPLES

A three ply tissue sheet having a finished basis weight of 22.7 pounds per 2880 square feet and a furnish consisting of 65 percent hardwood and 35 percent softwood fibers, was printed on both sides with a modified polysiloxane aqueous emulsion (FTS-226 manufactured by Witco Corporation, located at Greenwich, Conn.) via a simultaneous rotogravure printing process. The modified polysiloxane aqueous emulsion contained about 20 weight percent of an amino-modified polysiloxane, about 20 weight percent of a polyether-modified polysiloxane, about 57 weight percent water, about 2 weight percent emulsifiers, about 0.75 weight percent of a biocide package and a small amount of a buffering agent to adjust the pH of the final emulsion to within the range of about 6.5 to about 7.5. The ratio of the percent amino-modified polysiloxane to the percent polyether-modified polysiloxane was 50/50. The gravure rolls were electronically engraved, chrome over copper rolls supplied by Southern Graphics Systems, located at Louisville, Ky. The rolls had a line screen of 360 cells per lineal inch and a volume of 1.5 Billion Cubic Microns (BCM) per square inch of roll surface. Typical cell dimensions for this roll were 65 microns in length, 110 microns in width, and 13 microns in depth. The rubber backing offset applicator rolls were a 75 Shore A durometer cast polyurethane supplied by American Roller Company, located at Union Grove, Wis. The process was set up to a condition having 0.375 inch interference between the gravure rolls and the rubber backing rolls and 0.003 inch clearance between the facing rubber backing rolls. The simultaneous offset/offset gravure printer was run at a speed of 2000 feet per minute. This process yielded an add-on level of 1.0 weight percent total add-on based on the weight of the three ply tissue sheet.

Examples 1–5

A single-ply, three-layered uncreped throughdried bath tissue sheet was made generally in accordance with the following procedure using eucalyptus fibers for the outer layers and softwood fibers for the inner layer. Prior to pulping, a quaternary ammonium oleylimidazoline softening agent (Prosoft TQ-1003 from Hercules, Inc.) was added at a dosage of 4.1 kg/Mton of active chemical per metric ton of fiber to the eucalyptus furnish. After allowing 20 minutes of mixing time, the furnish was dewatered using a belt press to approximately 32% consistency. The filtrate from the dewatering process was either sewered or used as pulper make-up water for subsequent fiber batches but not sent forward in the stock preparation or tissue making process. The thickened pulp fiber containing the debonder was subsequently redispersed in water and used as the outer layer furnishes in the tissue making process. The softwood fibers were pulped for 30 minutes at 4 percent consistency and diluted to about 3.2 percent consistency after pulping, while the debonded eucalyptus fibers were diluted to about 2 percent consistency. The overall layered tissue sheet weight was split about 30%/about 40%/about 30% among the eucalyptus/refined softwood/eucalyptus fiber layers. The center layer was refined to levels required to achieve target strength values, while the outer layers provided the surface softness and bulk.

A three layer headbox was used to form the wet tissue sheet with the refined northern softwood kraft stock in the two center layers of the head box to produce a single center layer for the three-layered tissue product described. Turbulence-generating inserts recessed about 3 inches (75 millimeters) from the slice and layer dividers extending about 1 inch (25.4 millimeters) beyond the slice were employed. The net slice opening was about 0.9 inch (23 millimeters) and water flows in all four headbox layers were comparable. The consistency of the stock fed to the headbox was about 0.09 weight percent. The resulting three-layered tissue sheet was formed on a twin wire, suction form roll, former with forming fabrics such as Lindsay 2164 and Asten 867A fabrics, respectively. The speed of the forming fabrics was 11.9 meters per second. The newly-formed tissue sheet was then dewatered to a consistency of about 20 to about 27 percent using vacuum suction from below the forming fabric before being transferred to the transfer fabric, which was traveling at about 9.1 meters per second (30% rush transfer). The transfer fabric was an Appleton Wire T807-1. A vacuum shoe pulling about 6–15 inches (150–380 millimeters) of mercury vacuum was used to transfer the tissue sheet to the transfer fabric. The tissue sheet was then transferred to a throughdrying fabric (Lindsay Wire T1205-1). The throughdrying fabric was traveling at a speed of about 9.1 meters per second. The tissue sheet was carried over a Honeycomb throughdryer operating at a temperature of about 350° F. (175° C.) and dried to final dryness of about 94–98 percent consistency. The resulting uncreped tissue sheet was then wound into a parent roll.

The parent roll was then unwound and the tissue sheet was calendered twice. At the first station the tissue sheet was calendered between a steel roll and a rubber covered roll having a 4 P&J hardness. The calender loading was about 90 pounds per lineal inch (pli). At the second calendering station, the tissue sheet was calendered between a steel roll and a rubber covered roll having a 40 P&J hardness. The calender loading was about 140 pli. The thickness of the rubber covers was about 0.725 inch (1.84 centimeters). The calendered single-ply tissue sheet was then fed into the rubber-rubber nip of the rotogravure coater to apply the polysiloxane composition to both sides of the tissue sheet. The gravure rolls were electronically engraved, chrome over copper rolls supplied by Specialty Systems, Inc., located at Louisville, Ky. The rolls had a line screen of 200 cells per lineal inch and a volume of 6.0 Billion Cubic Microns (BCM) per square inch of roll surface. Typical cell dimensions for this roll were 140 microns in width and 33 microns in depth using a 130 degree engraving stylus. The rubber backing offset applicator rolls were a 75 Shore A durometer cast polyurethane supplied by American Roller Company, located at Union Grove, Wis. The process was set up to a condition having 0.375 inch interference between the gravure rolls and the rubber backing rolls and 0.003 inch clearance between the facing rubber backing rolls. The simultaneous offset/offset gravure printer was run at a speed of 500 feet per minute using gravure roll speed adjustment (differential) to meter the polysiloxane emulsion to obtain the desired addition rate. The gravure roll speed differential used for this example was 250 feet per minute. This process yielded an add-on level of 2.5 weight percent total solids add-on based on the weight of the tissue. The tissue was then converted into bath tissue rolls.

Determination of Film Modulus:

Several different films of synthetic co-polymer and synthetic co-polymer/polysiloxane compositions were cast from aqueous solution per the previously described method. The films were then tested for tensile strength and film modulus using the method described previously. Two different acrylate-based synthetic co-polymers useful in the present invention are set forth in Table 1:

TABLE 1

| Synthetic Co-polymer | Description |
|---|---|
| I | 80 mole % of n-butyl acrylate and 20 mole % of [2-(methacryloyloxy) ethyl] trimethyl ammonium chloride |
| II | 40 mole % of n-butyl acrylate, 40 mole % diacetone acrylamide and 20 mole % of [2-(methacryloyloxy) ethyl] trimethyl ammonium chloride |

Both synthetic co-polymers were prepared via a solvent exchange polymerization process and delivered as about 25% to about 30% solid dispersion in water with no additional surfactants. In addition, a higher Tg cationic cellulose fiber, available under the trade designation Celquat L-200, from National Starch located at Bridgewater, N.J., was used as a comparative control. This material is denoted by the number III in Table 2. A variety of polysiloxanes was blended with each of the synthetic co-polymers. The polysiloxanes used: Dow 193, a polysiloxane glycol polymer used in cosmetic applications as a plasticizer available from Dow Chemical Company located at Midland, Mich.; Dow 75 SF, a hydrogen functional polysiloxane used in waterproofing textiles available from Dow Chemical Company located at Midland, Mich.; Kelmar 1967E a hydrophilic amine functional polysiloxane available from Kelmar Industries, located at Duncan, S.C.; and, Y-14344, a hydrophobic amine functional polysiloxane commercially available from Crompton Chemical, located at Greenwich, Conn. As shown in Table 2, the films cast from the polysiloxane/synthetic co-polymer compositions of the present invention result in films having much lower moduli than those cast with the cationic cellulose fiber.

TABLE 2

| Synthetic Co-polymer | Polysiloxane | Mole % Acrylate | Mole % Polysiloxane | Modulus, MPa |
|---|---|---|---|---|
| II | — | 100 | 0 | 0.34 |
| II | Dow 193 | 90 | 10 | 0.12 |
| II | Dow 193 | 75 | 25 | 0.05 |
| II | Dow 75 SF | 75 | 25 | 0.20 |
| II | Dow 75 SF | 90 | 10 | 0.23 |
| II | Kelmar 1967E | 90 | 10 | 0.22 |
| I | — | 100 | 0 | 0.11 |
| I | Dow 75 SF | 50 | 50 | 0.05 |
| I | Dow 75 SF | 90 | 10 | 0.10 |
| I | Dow 193 | 75 | 25 | 0.01 |
| I | Dow 193 | 90 | 10 | 0.03 |
| I | Kelmar 1967E | 90 | 10 | 0.03 |
| I | Y-14344 | 90 | 10 | 0.07 |
| III | — | 100 | 0 | 16.96 |
| III | Dow 193 | 50 | 50 | 7.39 |
| III | Dow 193 | 75 | 25 | 14.00 |
| III | Dow 193 | 90 | 10 | 21.85 |
| III | Dow 75 SF | 50 | 50 | 11.52 |
| III | Dow 75 SF | 75 | 25 | 22.29 |
| III | Dow 75 SF | 90 | 10 | 25.77 |
| III | Kelmar 1967E | 75 | 25 | 17.26 |
| III | Kelmar 1967E | 90 | 10 | 20.62 |
| III | Y-14344 | 75 | 25 | 18.13 |
| III | Y-14344 | 90 | 10 | 18.51 |

Example 1

Example 1 is a control example wherein the cationic synthetic co-polymers of the present invention were not utilized. The aqueous polysiloxane was a commercially available polysiloxane emulsion, under the trade designation of 1967E from Kelmar, Inc., containing 25% of a hydrophilically-modified amino-functional polydiorganosiloxane amino-functional polydimethlysiloxane, 8.3% surfactant, 0.25% antifoaming agent, 0.2% acetic acid, 0.1% aloe, 0.1% Vitamin E, 0.05% preservative, and the balance being water.

Example 2

Example 2 illustrates the use of the cationic synthetic co-polymers of the present invention with the polysiloxane of Example 1. 2.5 gallons of the polysiloxane emulsion of Example 1 was blended with 2.5 gallons of an aqueous dispersion of a cationic synthetic co-polymer containing 80 mole % n-butyl acrylate and 20 mole % [2-(methacryloyloxy)ethyl]trimethyl ammonium chloride. The synthetic co-polymer was made via a solvent polymerization/aqueous exchange process and was delivered as a 25% solids dispersion in water. No other solvents or surfactants were present in the synthetic co-polymer dispersion. The polysiloxane emulsion and cationic synthetic co-polymer blend (a polysiloxane composition) was allowed to stir for 30 minutes under low shear using a standard mechanical mixer and the polysiloxane composition was then applied to the tissue sheet as in Example 1.

Example 3

Example 3 demonstrates the use of another hydrophilic polysiloxane emulsion in conjunction with the synthetic co-polymers of the present invention. 2.5 gallons of DC 7135, a hydrophilic polysiloxane emulsion comprising a blend of a hydrophobic amino functional polysiloxane and a hydrophilic polyether polysiloxane was blended with 2.5 gallons of an aqueous dispersion of a cationic synthetic co-polymer containing 80 mole % n-butyl acrylate and 20 mole % [2-(methacryloyloxy)ethyl]trimethyl ammonium chloride. The synthetic co-polymer was made via a solvent polymerization/aqueous exchange process and was delivered as an about 25% solids dispersion in water. No other solvents or surfactants were present in the synthetic co-polymer dispersion. The polysiloxane emulsion and cationic synthetic co-polymer blend (a polysiloxane composition) was allowed to stir for 30 minutes under low shear using a standard mechanical mixer and the polysiloxane composition was then applied to the tissue as in Example 1.

Example 4

Example 4 is a replication of Example 1.

Example 5

Example 5 is a replication of Example 2.

Example 6

Example 6 demonstrates the use of lower levels of the synthetic co-polymers of the present invention. Three gallons of the polysiloxane emulsion of Examples 1 and 4 was blended with 1 gallon of an aqueous dispersion of a cationic synthetic co-polymer containing 80 mole % n-butyl acrylate and 20 mole % [2-(methacryloyloxy)ethyl]trimethyl ammonium chloride. The synthetic co-polymer was made via a solvent polymerization/aqueous exchange process and was delivered as an about 25% solids dispersion in water. No other solvents or surfactants were present in the synthetic co-polymer dispersion. The polysiloxane emulsion and cationic synthetic co-polymer blend (a polysiloxane composition) was allowed to stir for 30 minutes under low shear using a standard mechanical mixer and the polysiloxane composition was then applied to the tissue sheet as in Example 1.

TABLE 3

| Example | % PDMS in total sheet | PDMS to Synthetic Copolymer Ratio (w/w) | Slough (mg) | % Slough Red. | Sensory Softness | Sensory Slough |
|---|---|---|---|---|---|---|
| 1 | 1.9 | 1:0 | 9.9 | 0 | n/a | n/a |
| 2 | 0.95 | 1:1 | 4.9 | 50.6 | + | ++ |
| 3 | 0.95 | 1:1 | 5.1 | 48.6 | 0 | ++ |
| 4 | 1.9 | 1:0 | 12.3 | 0 | n/a | n/a |
| 5 | 0.95 | 1:1 | 5.3 | 56.9 | − | ++ |
| 6 | 1.4 | 3:1 | 6.4 | 47.8 | + | ++ |

Creped Wet Press Examples:

A three ply, creped, wet press tissue sheet having a finished basis weight of 22.7 pounds per 2880 square feet and a furnish consisting of 65 percent hardwood and 35 percent softwood fibers, was printed on both sides with a modified polysiloxane aqueous emulsion (FTS-226 manufactured by Witco Corporation located at Greenwich, Conn.) via a simultaneous rotogravure printing process. The modified polysiloxane aqueous emulsion contained about 20 weight percent of an amino-modified polysiloxane, about 20 weight percent of a polyether-modified polysiloxane, about 57 weight percent water, about 2 weight percent emulsifiers, about 0.75 weight percent of a biocide package, and a small amount of a buffering agent to adjust the pH of the final emulsion to within the range of about 6.5 to about 7.5. The ratio of the percent amino-modified polysiloxane to the percent polyether-modified polysiloxane was about 50/50. The gravure rolls were electronically engraved, chrome over copper rolls supplied by Southern Graphics Systems, located at Louisville, Ky. The rolls had a line screen of 360 cells per lineal inch and a volume of 1.5 Billion Cubic Microns (BCM) per square inch of roll surface. Typical cell dimensions for this roll were 65 microns in length, 110 microns in width, and 13 microns in depth. The rubber backing offset applicator rolls were a 75 Shore A durometer cast polyurethane supplied by American Roller Company, located at Union Grove, Wis. The process was set up to a condition having 0.375 inch interference between the gravure rolls and the rubber backing rolls and 0.003 inch clearance between the facing rubber backing rolls. The simultaneous offset/offset gravure printer was run at a speed of 2000 feet per minute. This process yielded an add-on level of 1.0 weight percent total add-on based on the weight of the tissue sheet.

We claim:

1. A soft tissue sheet comprising papermaking fibers and a polysiloxane composition wherein the polysiloxane composition comprises an amino-functional polysiloxane and a compatible cationic synthetic resin binder having a glass transition temperature of about 100° C. or less.

2. The soft tissue sheet of claim 1, wherein the synthetic resin binder is a synthetic co-copolymer, the synthetic co-polymer having the general structure:

wherein:

each $R^1$, $R^2$, $R^3$ comprise independently a: H; $C_{1-4}$ alkyl radicals; or, mixtures thereof;

$R^4$ comprises a $C_1$–$C_8$ alkyl radical or mixtures thereof;

$Z^1$ comprises a bridging radical attaching the $R^4$ functionality to the polymer backbone;

$Q^1$ comprises a functional group comprising at least a cationic quaternary ammonium radical, $Q^2$ comprises a non-ionic hydrophilic monomer, a water-soluble monomer or mixtures thereof;

w, x, y $\geq$ 1, z $\geq$ 0; and the mole ratio of z to x is from about 0:1 to about 4:1.

3. A soft tissue sheet comprising papermaking fibers and a polysiloxane composition wherein the polysiloxane composition comprises a polysiloxane and a compatible cationic synthetic resin binder having a glass transition temperature of about 100° C. or less, wherein the polysiloxane has the general structure of:

wherein:

each $R^1$–$R^8$ moiety comprises independently a $C_1$ or higher of alkyl group, aryl group, polyester, amine, imine, amide or mixtures thereof; and y is an integer greater than 1.

4. The soft tissue sheet of claim 1, wherein the polysiloxane has the general structure of:

$$R^2-\underset{\underset{R^3}{|}}{\overset{\overset{R^1}{|}}{Si}}-O-\left[\underset{\underset{R^8}{|}}{\overset{\overset{R^7}{|}}{Si}}-O\right]_y\left[\underset{\underset{R^{10}}{|}}{\overset{\overset{R^9}{|}}{Si}}-O\right]_x\underset{\underset{R^6}{|}}{\overset{\overset{R^4}{|}}{Si}}-R^5$$

wherein:

x and y are integers >0;

the mole ratio of x to (x+y) is from about 0.005 percent to about 25 percent;

each $R^{1-R9}$ moiety comprises independenty an organofunctional group or mixtures thereof; and, $R^{10}$ comprises an amino functional moiety or mixtures thereof.

5. The soft tissue sheet of claim 4, wherein each $R^1-R^9$ moiety comprises independently a $C_1$ or higher of alkyl group, aryl group, ether, polyether, polyester, amide, or mixtures thereof.

6. The soft tissue sheet of claim 1, wherein the polysiloxane has the general structure of:

$$R^2-\underset{\underset{R^3}{|}}{\overset{\overset{R^1}{|}}{Si}}-O-\left[\underset{\underset{R^8}{|}}{\overset{\overset{R^7}{|}}{Si}}-O\right]_x\left[\underset{\underset{R^{10}}{|}}{\overset{\overset{R^9}{|}}{Si}}-O\right]_y\left[\underset{\underset{R^{11}}{|}}{\overset{\overset{R^0}{|}}{Si}}-O\right]_z\underset{\underset{R^6}{|}}{\overset{\overset{R^4}{|}}{Si}}-R^5$$

wherein:

x and z are integers >0;

y is an integer $\geq 0$;

the mole ratio of x to (x+y+z) is from about 0.05 percent to about 95 percent;

the mole ratio of y to (x+y+z) is from about 0 percent to about 25 percent;

each $R^0-R^9$ comprises independently an organofunctional group or mixtures thereof;

$R^{10}$ comprises an amino functional moiety or mixtures thereof; and, $R^{11}$ comprises a hydrophilic functionality or mixtures thereof.

7. The soft tissue sheet of claim 6, wherein each $R^0-R^9$ moiety comprises independently a $C_1$ or higher of alkyl group, aryl group, ether, polyether, polyester, amine, imine, amide, substituted amide, or mixtures thereof.

8. The tissue product of claim 6, wherein $R^{10}$ comprises an amino functional moiety selected from a primary amine, secondary amine, tertiary amine, quaternary amine, unsubstituted amide, and mixtures thereof.

9. The tissue product of claim 6, wherein $R^{11}$ comprises a polyether functional group having the formula: $-R^{12}-(R^{13}-O)_a-(R^{14}O)_b-R^{15}$ wherein:

each $R^{12}, R^{13}$, and $R^{14}$ comprises independently branched $C_{1-4}$ alkyl groups, linear $C_{1-4}$ alkyl groups, or mixtures thereof;

$R^{15}$ comprises H, $C_{1-30}$ alkyl group, or mixtures thereof; and, a and b are integers of from about 1 to about 100.

10. The soft tissue sheet of claim 2, wherein the mole ratio of (x+z) to y is from about 0.98:0.02 to about 1:1.

11. The soft tissue sheet of claim 2, wherein $Z^1$ comprises a: —O—; —COO—; —OOC—; —CONH—; —NHCO—; or, mixtures thereof.

12. The soft tissue sheet of claim 2, wherein $R^1$ is H, $R^2$ is H, $R^3$ is a: H, —$CH_3$ or mixtures thereof, and $R^4$ is a: methyl radicals; ethyl radicals; propyl radicals; butyl radicals; or, mixtures thereof.

13. The soft tissue sheet of claim 2, wherein $Q^1$ is derived from monomers selected from the group: [2-(methacryloyloxy)ethyl]trimethylammonium methosulfate; [2-(methacryloyloxy)ethyl]trimethylammonium ethosulfate; dimethyldiallyl ammonium chloride; 3-acryloamido-3-methyl butyl trimethyl ammonium chloride; trimethylamino methacrylate; vinyl benzyl trimethyl ammonium chloride; 2-[(acryloyloxy)ethyl]trimethylammonium chloride; [2-(methacryloyloxy)ethyl]trimethylammonium chloride; and, mixtures thereof.

14. The soft tissue sheet of claim 1, wherein the amount of the compatible synthetic co-polymer is from about 2 to about 90 weight percent of the polysiloxane on a dry solids basis.

15. The soft tissue sheet of claim 1, wherein the amount of the compatible synthetic co-polymer is from about 5 to about 75 weight percent of the polysiloxane on a dry solids basis.

16. The soft tissue sheet of claim 1, wherein the amount of the compatible synthetic co-polymer is from about 10 to about 50 weight percent of the polysiloxane on a dry solids basis.

17. The soft tissue sheet of claim 1, wherein the soft tissue sheet has a basis weight of about 5 to about 150 $g/m^2$ and a bulk of about 2 $cm^3/g$ or greater.

18. The soft tissue sheet of claim 1, wherein the compatible synthetic co-polymer is water dispersible.

19. The soft tissue sheet of claim 1, wherein the compatible synthetic co-polymer is water soluble.

20. The soft tissue sheet of claim 1, wherein the compatible synthetic co-polymer is derived from a solution polymerization process and is delivered to the tissue sheet as an aqueous dispersion of solution.

21. A polysiloxane composition suitable for treating a tissue sheet containing papermaking fibers, said polysiloxane composition comprising an amino-functional polysiloxane and a compatible cationic synthetic resin binder having a glass transition temperature of about 100° C. or less.

22. The polysiloxane composition of claim 21, wherein the polysiloxane composition comprises an aqueous dispersion or emulsion of the amino-functional polysiloxane and the compatible cationic synthetic resin binder having a glass transition temperature of about 100° C. or less.

23. The polysiloxane composition of claim 21, wherein the polysiloxane composition comprises a blend of an aqueous amino-functional polysiloxane emulsion and an aqueous dispersion of the compatible cationic synthetic resin binder having a glass transition temperature of about 100° C. or less.

24. The polysiloxane composition of claim 21, wherein the polysiloxane composition comprises a blend of an aqueous amino-functional polysiloxane emulsion and an aqueous emulsion of the compatible cationic synthetic resin binder having a glass transition temperature of about 100° C. or less.

25. The polysiloxane composition of claim 21, wherein the compatible cationic synthetic resin binder has the general structure:

wherein:

each $R^1$, $R^2$, $R^3$ comprise independently a: H; $C_{1-4}$ alkyl radicals; or, mixtures thereof;

$R^4$ comprises a $C_1$–$C_8$ alkyl radical or mixtures thereof;

$Z^1$ comprises a bridging radical attaching the $R^4$ functionality to the polymer backbone;

$Q^1$ comprises a functional group comprising at least a cationic quaternary ammonium radical;

$Q^2$ comprises a non-ionic hydrophilic monomer, a water soluble monomer or mixtures thereof;

wherein w, x, y≧1, z≧0; and the mole ratio of z to x is from about 0:1 to about 4:1.

26. A polysiloxane composition suitable for treating a tissue sheet containing papermaking fibers, said polysiloxane composition comprising a polysiloxane and a compatible cationic synthetic resin binder having a glass transition temperature of about 100° C. or less, wherein the polysiloxane has the general structure of:

wherein:

each $R^1$–$R^8$ moiety comprises independently a $C_1$ or higher of alkyl group, aryl group, polyester, amine, imine, amide or mixtures thereof; and y is an integer greater than 1.

27. The polysiloxane composition of claim 21, wherein the polysiloxane has the general structure of:

wherein:

x and y are integers 0;

the mole ratio of x to (x+y) is from about 0.005 percent to about 25 percent;

each $R^1$–$R^9$ moiety comprises independently an organofunctional group or mixtures thereof; and, $R^{10}$ comprises an amino functional moiety or mixtures thereof.

28. The polysiloxane composition or claim 27, wherein each $R^1$–$R^9$ moiety comprises independently a $C_1$ or higher of alkyl group, aryl group, ether, polyether, polyester, amide, or mixtures thereof.

29. The polysiloxane composition of claim 21, wherein the polysiloxane has the general structure of:

wherein:

x and z are integers >0;

y is an integer ≧0;

the mole ratio of x to (x+y+z) is from about 0.05 percent to about 95 percent;

the mole ratio of y to (x+y+z) is from about 0 percent to about 25 percent;

each $R^0$–$R^9$ comprises independently an organofunctional group or mixtures thereof;

$R^{10}$ comprises an amino functional moiety or mixtures thereof; and, $R^{11}$ comprises a hydrophilic functionality or mixtures thereof.

30. The polysiloxane composition of claim 29, wherein each $R^0$–$R^9$ moiety comprises independently a $C_1$ or higher of alkyl group, aryl group, ether, polyether, polyester, amine, imine, amide, substituted amide, or mixtures thereof.

31. The polysiloxane composition of claim 29, wherein $R^{10}$ comprises an amino functional moiety selected from a primary amine, secondary amine, tertiary amine, quaternary amine, unsubstituted amide, and mixtures thereof.

32. The polysiloxane composition of claim 29, wherein $R^{11}$ comprises a polyether functional group having the formula: —$R^{12}$—($R^{18}$—O)$_a$—($R^{14}$ O)$_b$—$R^{15}$ wherein:

each $R^{12}$, $R^{13}$, and $R^{14}$ comprises independently branched $C_{1-4}$ alkyl groups, linear $C_{1-4}$ alkyl groups, or mixtures thereof;

$R^{15}$ comprises H, $C_{1-30}$, alkyl group, or mixtures thereof; and, a and b are integers of from about 1 to about 100.

33. The polysiloxane composition of claim 25, wherein the mole ratio of (x+z) to y of the compatible synthetic resin binder is from about 0.98:0.02 to about 1:1.

34. The polysiloxane composition of claim 25, wherein $Z^1$ comprises a: —O—; —COO—; —OOC—; —CONH—; —NHCO—; or, mixtures thereof.

35. The polysiloxane composition of claim 25, wherein $R^1$ is H, $R^2$ is H, $R^3$ is a: H, —$CH_3$ or mixtures thereof, and $R^4$ is a: methyl radicals; ethyl radicals; propyl radicals; butyl radicals; or, mixtures thereof.

36. The polysiloxane composition claim 25, wherein $Q^1$ of the compatible synthetic resin binder is derived from monomers selected from the group: [2-(methacryloyloxy) ethyl]trimethylammonium methosulfate; [2-(methacryloyloxy)ethyl]trimethylammonium ethosulfate; dimethyldiallyl ammonium chloride; 3-acryloamido-3-methyl butyl trimethyl ammonium chloride; trimethylamino methacrylate; vinyl benzyl trimethyl ammonium chloride; 2-[(acryloyloxy)ethyl]trimethylammonium chloride; [2-(methacryloyloxy)ethyl ]trimethylammonium chloride; and, mixtures thereof.

37. The polysiloxane composition of claim 21, wherein the amount of the compatible synthetic co-polymer is from about 2 to about 90 weight percent of the polysiloxane on a dry solids basis.

38. The polysiloxane composition of claim 21, wherein the amount of the compatible synthetic co-polymer is from about 5 to about 75 weight percent of the polysiloxane on a dry solids basis.

39. The polysiloxane composition of claim 21, wherein the amount of the compatible synthetic co-polymer is from about 10 to about 50 weight percent of the polysiloxane on a dry solids basis.

40. The polysiloxane composition of claim 21, wherein the compatible synthetic resin binder has an average weight average molecular weight between about 10,000 to about 5,000,000.

41. The polysiloxane composition of claim 21, wherein the compatible synthetic resin binder is water dispersible or water soluble.

42. The polysiloxane composition of claim 25, wherein $Q^2$ is derived from monomers selected from the group of: hydroxyalkyl acrylates; hydroxyalkyl methacrylates; hydroxyethyl acrylate; polyalkoxyl acrylates; polyalkoxyl methacrylates; diacetone acrylamide; N-vinylpyrrolidinone; N-vinylformamide; and, mixtures thereof.

43. The polysiloxane composition of claim 25, wherein $Q^1$ is derived from monomers selected from the group: [2-(methacryloyloxy) ethyl ]trimethylammonium methosulfate; [2-(methacryloyloxy)ethyl ]trimethylammonium ethosulfate; dimethyldiallyl ammonium chloride; 3-acryloamido-3-methyl butyl trimethyl ammonium chloride; trimethylamino methacrylate; vinyl benzyl trimethyl ammonium chloride; 2-[(acryloyloxy)ethyl] trimethylammonium chloride; [2-(methacryloyloxy)ethyl ]trimethylammonium chloride; and, mixtures thereof.

44. The polysiloxane composition of claim 42, wherein the polyalkoxyl acrylate is a polyethyleneglycol acrylate.

45. The polysiloxane composition of claim 42, wherein the polyalkoxyl methacrylate is a polyethyleneglycol methacrylate.

46. The soft tissue sheet of claim 1, wherein the polysiloxane composition has a film modulus of about 0.5 MPa or less.

47. The polysiloxane composition of claim 21, wherein the polysiloxane composition has a film modulus of about 0.5 MPa or less.

48. The soft tissue sheet of claim 1, wherein the compatible cationic synthetic resin binder has a glass transition temperature about 40° C. or less.

49. The polysiloxane composition of claim 21, wherein the compatible cationic synthetic resin binder has a glass transition temperature about 40° C. or less.

* * * * *